(12) United States Patent
Park et al.

(10) Patent No.: US 12,126,789 B2
(45) Date of Patent: Oct. 22, 2024

(54) LENS ARRAY AND DISPLAY DEVICE INCLUDING THE SAME

(71) Applicant: SAMSUNG DISPLAY CO., LTD., Yongin-si (KR)

(72) Inventors: Jeong Woo Park, Yongin-si (KR); Beom Shik Kim, Seoul (KR); Young Chan Kim, Incheon (KR); Su Bin Jung, Incheon (KR); Young Sang Ha, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/069,177

(22) Filed: Dec. 20, 2022

(65) Prior Publication Data

US 2023/0283760 A1    Sep. 7, 2023

(30) Foreign Application Priority Data

Mar. 3, 2022    (KR) ........................ 10-2022-0027425

(51) Int. Cl.
*H04N 13/307* (2018.01)
*G02B 30/29* (2020.01)

(52) U.S. Cl.
CPC ........... *H04N 13/307* (2018.05); *G02B 30/29* (2020.01)

(58) Field of Classification Search
CPC ........ G02B 3/005; G02B 30/27; G02B 30/29; G02B 5/005; H04N 13/305; H04N 13/307
USPC .......................................................... 348/51
See application file for complete search history.

(56) References Cited

U.S. PATENT DOCUMENTS

| | | | | |
|---|---|---|---|---|
| 11,171,260 | B2* | 11/2021 | Ozeki | ................ H01L 25/0753 |
| 2014/0009823 | A1* | 1/2014 | Park | .................... G02B 5/3058 |
| | | | | 427/160 |
| 2014/0078274 | A1* | 3/2014 | Kroon | ................... G02B 30/27 |
| | | | | 348/59 |
| 2018/0259799 | A1 | 9/2018 | Kroon | |
| 2018/0313982 | A1* | 11/2018 | Bando | .............. H01L 27/14625 |
| 2019/0214440 | A1* | 7/2019 | Lee | ......................... G06F 3/044 |
| 2022/0340008 | A1* | 10/2022 | Yueh | ................... B60K 35/425 |

FOREIGN PATENT DOCUMENTS

| | | | | |
|---|---|---|---|---|
| CN | 100458500 C | * | 2/2009 | .......... G02F 1/1339 |
| CN | 104423052 | | 4/2017 | |
| CN | 111383577 A | * | 7/2020 | .......... G02B 6/0033 |

(Continued)

OTHER PUBLICATIONS

Andrew J. Woods, "Crosstalk in stereoscopic displays: a review," Journal of Electronic Imaging 21(4), 040902-040902-21 (Oct.-Dec. 2012).

(Continued)

*Primary Examiner* — Behrooz M Senfi
(74) *Attorney, Agent, or Firm* — F. Chau & Associates, LLC

(57) ABSTRACT

A display device includes a display panel, and a lens array disposed on a surface of the display panel. The lens array includes a plurality of lenses and a light transmission characteristic control layer disposed on a valley of each of the lenses. The light transmission characteristic control layer includes a light absorbing material. A stacked thickness of the light transmission characteristic control layer is smaller than a height of each of the lenses.

25 Claims, 24 Drawing Sheets

(56) References Cited

FOREIGN PATENT DOCUMENTS

| JP | 2004-163530 | 6/2004 | | |
|---|---|---|---|---|
| KR | 10-2008-0086756 | 9/2008 | | |
| KR | 10-2014-0065506 | 5/2014 | | |
| KR | 10-2191552 | 12/2020 | | |
| WO | WO 2017-138394 | 8/2017 | | |
| WO | WO-2023052922 A1 * | 4/2023 | ............ | H01L 51/52 |

OTHER PUBLICATIONS

Je-Ryung Lee, et al., "Geometric and Wave Optic Features in the Optical Transmission Patterns of Injection-molded Mesoscale Pyramid Prism Patterned Plates," Current Optics and Photonics, vol. 2, No. 2, Apr. 2018, pp. 140-146.

* cited by examiner (a)

(b)

(c)

LENS ARRAY AND DISPLAY DEVICE INCLUDING THE SAME

CROSS-REFERENCE TO RELATED APPLICATION

This U.S. non-provisional patent application claims priority under 35 U.S.C. § 119 to Korean Patent Application No. 10-2022-0027425, filed in the Korean Intellectual Property Office (KIPO) on Mar. 3, 2022, the disclosure of which is incorporated by reference in its entirety herein.

1. TECHNICAL FIELD

The present disclosure relates to a display, and more particularly, to a lens array and a display device including the same.

2. DISCUSSION OF RELATED ART

Various types of display devices are in wide use today. Popular examples of display devices include liquid crystal displays (LCDs), plasma display panels (PDPs), and organic light emitting diose (OLED) displays.

Some display devices are capable of displaying a three-dimensional image. These devices are known as stereoscopic image display devices and they may be able to direct different images to a viewer's left and right eyes without the need for 3D glasses to be worn. Also, in a viewing angle control display device, different images may be sent to different viewers who are viewing the display device from different angles. Both of these display devices may utilize a lens array.

SUMMARY

A display device includes a display panel, and a lens array disposed on a surface of the display panel. The lens array includes a plurality of lenses and a light transmission characteristic control layer disposed on a valley of each of the lenses. The light transmission characteristic control layer includes a light absorbing material, and a stacked thickness of the light transmission characteristic control layer is smaller than a height of each of the lenses.

The light transmission characteristic control layer may expose at least a portion of each of the lenses.

A width of the light transmission characteristic control layer may be in a range of from 25% to 40% of a width of each of the lenses.

The display panel may include a plurality of pixels, each comprising an emission area, and the light transmission characteristic control layer might not overlap the emission area.

The width of the light transmission characteristic control layer may be smaller than or equal to a gap between adjacent emission areas.

An extinction coefficient of the light transmission characteristic control layer may be in the range of $1.95 \times 10^2$ to $1.95 \times 10^3$ $M^{-1} \cdot cm^{-1}$.

A molar concentration of the light absorbing material may be in the range of 0.05 M to 0.5 M.

The light transmission characteristic control layer may directly contact a surface of each of the lenses.

A solid-phase refractive index of the light transmission characteristic control layer may be 0.9 to 1 times a solid-phase refractive index of each of the lenses.

A thickness of the light transmission characteristic control layer may decrease from a center toward edges thereof.

An upper surface of the light transmission characteristic control layer may be flat.

Each lens may extend in a first direction, and the lenses may be arranged in a second direction intersecting the first direction.

The light transmission characteristic control layer may have a line shape extending in the first direction in a plan view.

The light transmission characteristic control layer may further include a photocurable resin, and the light absorbing material may be distributed within the photocurable resin.

Each lens may be shaped like a circular or polygonal island in a plan view.

The light transmission characteristic control layer may at least partially surround each lens in a plan view.

The light transmission characteristic control layer may be coated on each of the lenses through a jetting process or a needle application process.

The light absorbing material may be an electrochromic material or a photochromic material.

A lens array includes a pattern layer including a plurality of lenses, and a light transmission characteristic control layer disposed on a valley of each of the lenses. The light transmission characteristic control layer includes a light absorbing material, and a stacked thickness of the light transmission characteristic control layer is smaller than a height of each of the lenses.

The pattern layer may further include a base portion disposed under the lenses and integrally connecting the lenses.

The lens array may further include a base disposed under the pattern layer.

A width of the light transmission characteristic control layer may be in the range of 25% to 40% of a width of each of the lenses.

An extinction coefficient of the light transmission characteristic control layer may be in the range of $1.95 \times 10^2$ to $1.95 \times 10^3$ $M^{-1} \cdot cm^{-1}$.

A molar concentration of the light absorbing material in the light transmission characteristic control layer may be in the range of 0.05 M to 0.5 M.

BRIEF DESCRIPTION OF THE DRAWINGS

The above and other features of the present disclosure will become more apparent by describing in detail embodiments thereof, with reference to the accompanying drawings, in which.

DETAILED DESCRIPTION OF THE EMBODIMENTS

Figure 1:
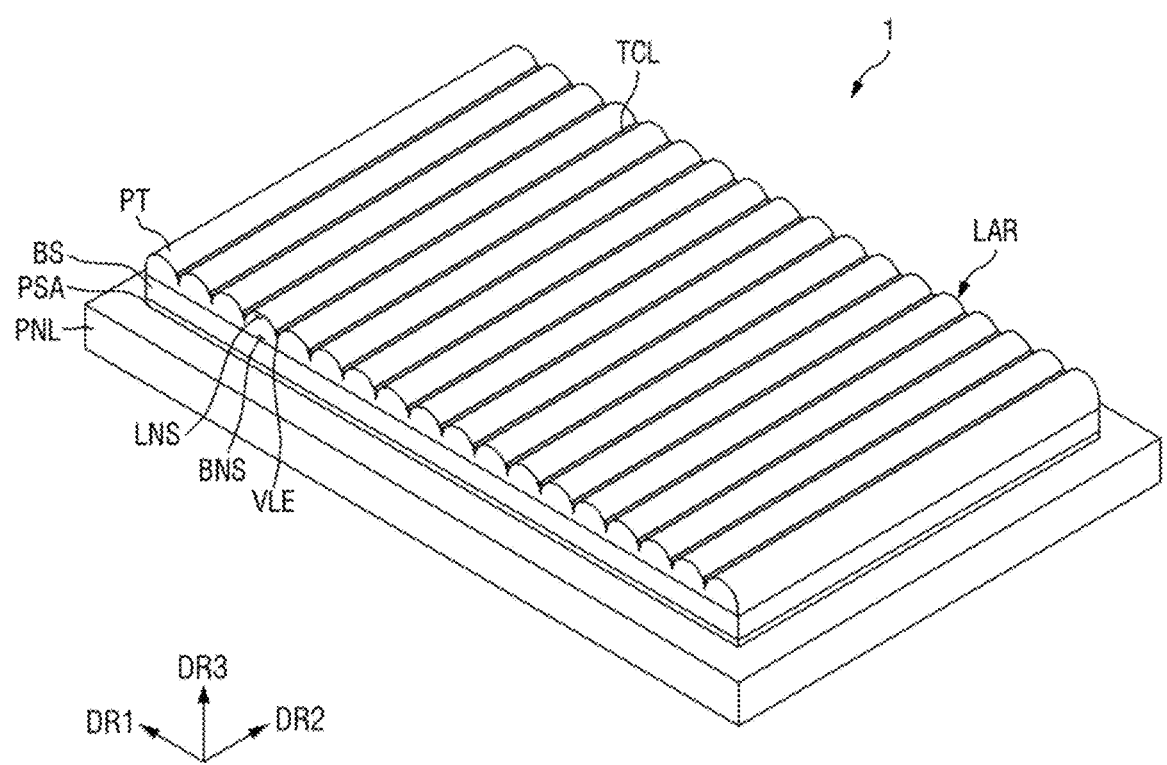
FIG. 1 is a perspective view of a display device according to an embodiment of the present disclosure.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not necessarily limited to follow exactly one direction, and may follow along an axis formed by the direction, unless the context clearly indicates otherwise.

Figure 2:
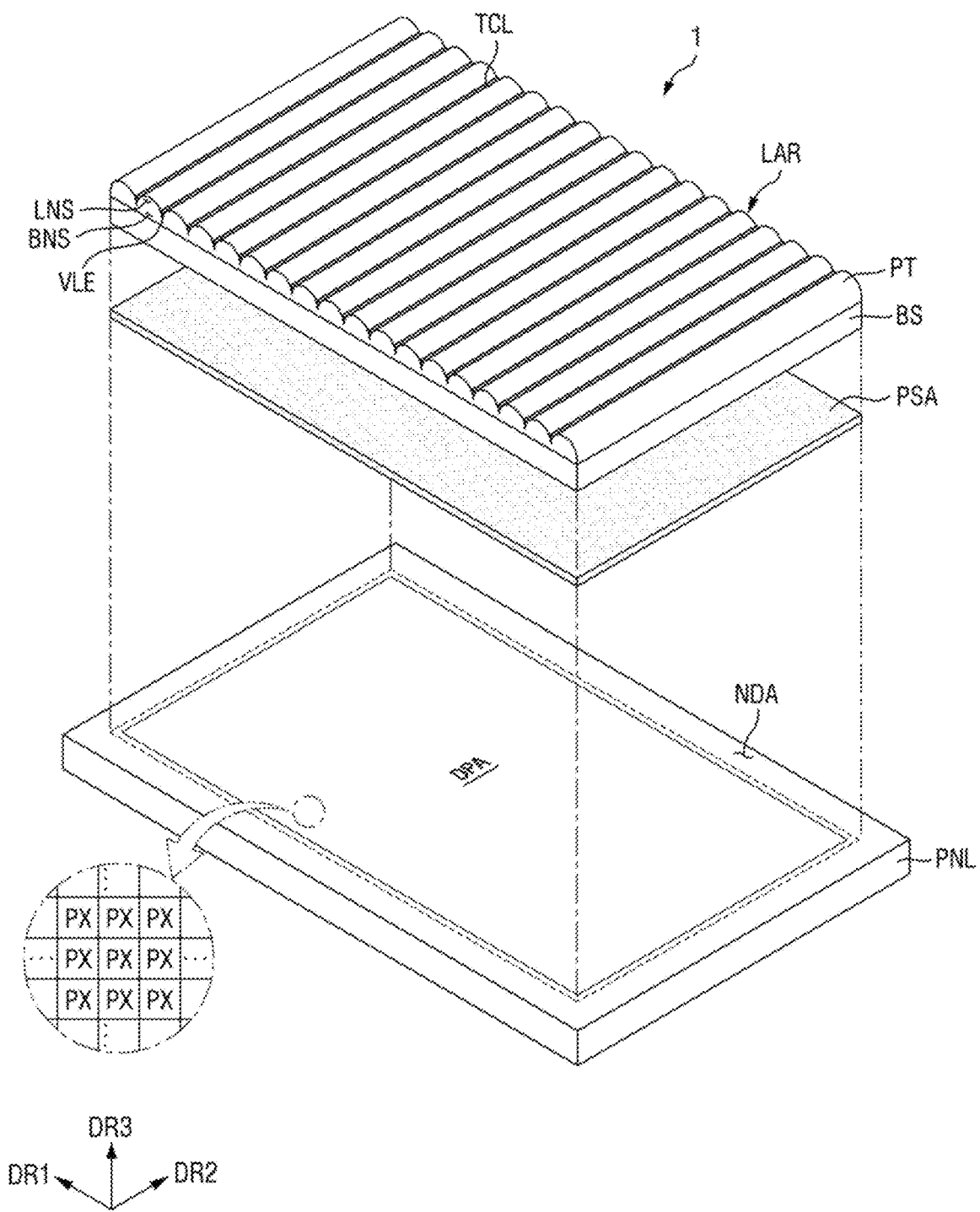
FIG. 2 is an exploded perspective view of the display device of FIG. 1.

FIG. 1 is a perspective view of a display device 1 according to an embodiment of the present disclosure. FIG. 2 is an exploded perspective view of the display device 1 of FIG. 1.

In the following description, a first direction DR1, a second direction DR2, and a third direction DR3 intersect in different directions. In an embodiment, the first direction DR1, the second direction DR2, and the third direction DR3 may intersect perpendicularly. The first direction DR1 may be a vertical direction, the second direction DR2 may be a horizontal direction, and the third direction DR3 may be a thickness direction.

Referring to FIGS. 1 and 2, the display device 1 is a device that displays moving images and/or still images. The display device 1 may refer to any electronic device that provides a display screen. Examples of the display device 1 may include a television, a notebook/laptop computer, a computer monitor, a tablet personal computer (PCs), a vehicle navigation device, a vehicle display and/or instrument cluster, a mobile phone, a smartphone, an electronic watch, a smart watch, a watch phone, a mobile communication terminal, an electronic notebook, an electronic book, a portable multimedia player (PMP), a portable game console, a digital camera, a billboard, and an Internet of things (IoT) device, all of which provide a display screen.

The display device 1 may be a light field display device that provides different image information at each location thereof. For example, the display device 1 may divide and provide an image displayed on a display panel PNL in a space on a front surface of the display device 1 by using a lens array LAR. By appropriately utilizing this image information provision method, the display device 1 can be used as a stereoscopic image display device that provides a 3D image or a viewing angle control display device that shows different images to users located at different viewing angles with respect to the display device 1.

The planar shape of the display device 1 is not necessarily limited to the examples provided herein. For example, the planar shape of the display device 1 may be modified to various shapes such as a rectangle, a square, a rhombus, other polygons, a circle, and an oval according to the field to which the display device 1 is applied. The exemplified planar shape of the display device 1 is a rectangle, and a pair of long sides extend in the first direction DR1 while a pair of short sides extend in the second direction DR2.

The display device 1 may include the display panel PNL, the lens array LAR, and a bonding PSA bonding the lens array LAR to the display panel PNL.

The display panel PNL provides a display screen. In the exemplified display device 1, a direction in which the display panel PNL provides the display screen is a first side (i.e., an upward direction) in the third direction DR3. The display panel PNL may have a planar shape substantially similar to that of the display device 1.

Examples of the display panel PNL may include an organic light emitting display panel, an inorganic light emitting display panel, a micro light emitting diode (LED) display panel, a nano LED display panel, a quantum dot light emitting diode display panel, a liquid crystal display panel, a plasma display panel, a field emission display panel, an electrophoretic display panel, and an electrowetting display panel. A case where an organic light emitting display panel is applied as an example of the display panel PNL will be described below, but the present disclosure is not necessarily limited to this case, and other display panels PNL can also be applied as long as the same technical spirit is applicable.

The display panel PNL may have a planar shape similar to that of the display device 1. For example, the display panel PNL may have a rectangular planar shape.

The display panel PNL includes a display area DPA and a non-display area NDA. The display area DPA is an area where a screen is disposed, and the non-display area NDA is an area where no screen is disposed (or a region of screen that does not display an image). The non-display area NDA may be disposed at least partially around the display area DPA. When the display area DPA has a rectangular shape, the non-display area NDA may surround four sides of the display area DPA. However, the present disclosure is not necessarily limited thereto. For example, the non-display area NDA may also be disposed around only some sides of the display area DPA. In some cases, the non-display area NDA may exist inside the display area DPA and may be at least partially surrounded by the display area DPA.

To display an image, the display panel PNL may include data lines, scan lines, and a plurality of pixels PX connected to the data lines and the scan lines. The pixels PX may include a plurality of color pixels PX. For example, the pixels PX may include a plurality of red pixels PX, a plurality of green pixels PX, and a plurality of blue pixels PX. The red pixels PX, the green pixels PX, and the blue pixels PX may be alternately arranged.

Each of the pixels PX may be connected to at least one scan line and at least one data line. Each of the pixels PX may include thin-film transistors, such as a driving transistor and at least one switching transistor, and a light emitting element. Each of the pixels PX may receive a data voltage of a data line in response to a scan signal transmitted from a scan line and may emit light by supplying a driving current to a light emitting element according to the data voltage applied to a gate electrode of the driving transistor.

The bonding PSA is disposed on a surface (display surface) of the display panel PNL. The bonding PSA may be optically transparent. Examples of the bonding PSA may include an adhesive tape, an adhesive, a gluing agent, and a bonding resin.

The lens array LAR is disposed on a surface of the bonding PSA. The lens array LAR may be attached to the surface of the display panel PNL through the bonding PSA. The lens array LAR and the bonding PSA may have a same shape in a plan view. The bonding PSA may have a size smaller than or equal to that of the lens array LAR. The bonding PSA might not protrude beyond the lens array LAR, but the present disclosure is not necessarily limited thereto.

The planar shape of the lens array LAR may be substantially the same as the planar shape of the display panel PNL. The size of the lens array LAR may be smaller than or equal to the size of the display panel PNL in a plan view. The lens array LAR covers the entire display area DPA of the display panel PNL. The lens array LAR may further cover part or all of the non-display area NDA in addition to the display area DPA of the display panel PNL. In the drawings, the lens array LAR covers all of the display area DPA and part of the non-display area NDA of the display panel PNL, and the non-display area NDA of the display panel PNL is left uncovered by the lens array LAR. Although the non-display area NDA of the display panel PNL is left uncovered by the lens array LAR in the drawings, the placement of the lens array LAR is not necessarily limited thereto.

The lens array LAR may include a base BS, a pattern layer PT disposed on the base BS, and a light transmission characteristic control layer TCL disposed on a portion of the pattern layer PT.

The base BS may be a transparent film. The base BS may be made of a material typically applied to an optical film, such as polyethylene terephthalate (PET), polycarbonate (PC), polyethylene (PE), polypropylene (PP), polysulfone (PSF), polymethyl methacrylate (PMMA), triacetyl cellulose (TAC), cycloolefin polymer (COP), or cycloolefin copolymer (COC). The light transmittance of the base BS may be, but is not necessarily limited to being, 90% or more.

The pattern layer PT may include a transparent resin. The pattern layer PT may include a photocurable resin such as epoxy acrylate-based resin, urethane acrylate-based resin or silicone acrylate-based resin or may include a thermosetting resin such as acrylic resin, urethane-based resin or polyester-based resin. The resin that forms the pattern layer PT may have a light transmittance of, but not necessarily limited to being, 90% or more.

The pattern layer PT may have a solid-phase refractive index of 1.5 or more. In addition, the pattern layer PT may be made of a high refractive material having a solid-phase refractive index of 1.6 or more. In an embodiment, the pattern layer PT may have a solid-phase refractive index of 1.63 to 1.76, preferably, 1.65 to 1.67.

The pattern layer PT includes surface irregularities. The surface of the pattern layer PT includes a plurality of convex portions and a recessed portion disposed between neighboring pairs of the convex portions. Each of the convex portions has a convex cross-section, and a pattern portion having such a convex shape will hereinafter be referred to as a lens LNS. A highest portion of the lens LNS is referred to as a peak (or top) of the lens LNS, and a lowest portion of the lens LNS, for example, a recessed portion located between the convex portions is referred to as a lens valley VLE. The lens valley VLE is located at a boundary between neighboring pairs of a plurality of lenses LNS.

Each lens LNS may extend in one direction. For example, each lens LNS may be formed in a line shape in a plan view. For example, as illustrated in FIGS. 1 and 2, each lens LNS may extend in the second direction DR2, which is a short side extending direction of the display device 1. The lenses LNS are arranged in a direction intersecting the direction in which each lens LNS extends. For example, the lenses LNS may be arranged along the first direction DR1.

Cross-sections of the lenses LNS taken in a direction perpendicular to the extending direction of the lenses LNS may have substantially a same shape and size. In an embodiment, the cross-sectional shape of each lens LNS may be a part of a circle (e.g., a semicircle or a fan shape having a central angle of less than 180 degrees) or an ellipse (e.g., a semi-ellipse). In an embodiment, the lenses LNS may be generally shaped like lenticular lenses. The cross-sectional shape of each lens LNS may also be a triangle or other polygonal shapes. For example, the lenses LNS may be generally shaped like prism lenses.

The pattern layer PT may further include a base portion BS (or a relieving portion) disposed under the lenses LNS to integrally connect the lenses LNS. A virtual surface connecting a plurality of lens valleys VLE may be defined as a boundary between the lenses LNS and the base portion BS.

The light transmission characteristic control layer TCL is disposed on each of the lens valleys VLE. When the lens valleys VLE extend along the second direction DR2, the light transmission characteristic control layer TCL also extends along the second direction DR2. The light transmission characteristic control layer TCL includes a light absorbing material controlling light transmission characteristics. The light absorbing material may be, for example, a black dye or a black pigment. In the field of display devices, various materials included in a black matrix may be applied as the light absorbing material.

In some embodiments, the light absorbing material may be an electrochromic material in which a light absorption state and a light transmission state are changed by an electrical signal or a photochromic material in which a light absorption state and a light transmission state are changed according to the degree of exposure to light of a specific wavelength. When a photochromic material is applied as the light absorbing material, it is easier to provide a provision state of a display screen such as 2D/3D conversion.

When the pattern layer PT includes the base portion BS, the light transmission characteristic control layer TCL may be spaced apart from a structure under the lens array LAR, for example, from the surface of the display panel PNL or the bonding PSA by more than a thickness of the base portion BS. The light transmission characteristic control layer TCL will be described in detail later.

Figure 3:
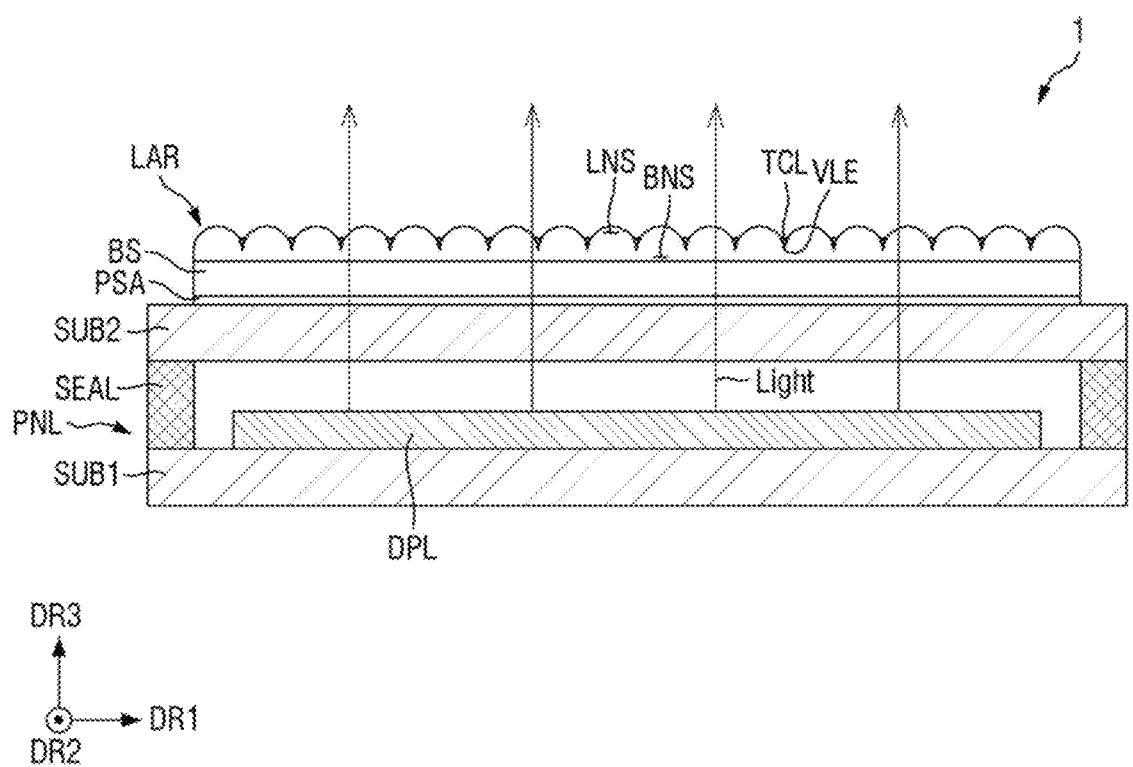
FIG. 3 is a cross-sectional view of the display device according to the embodiment of the present disclosure.

FIG. 3 is a cross-sectional view of the display device 1 according to an embodiment of the present disclosure.

Referring to FIG. 3, the display panel PNL includes a first substrate SUB1 and a display layer DPI disposed on the first substrate SUB1. The display panel PNL may further include a second substrate SUB2 facing the first substrate SUB1 and a sealing SEAL bonding the first substrate SUB1 and the second substrate SUB2 together at an edge portion thereof. The second substrate SUB2 may be spaced apart from an upper surface of the display layer DPI. In this case, a space between the second substrate SUB2 and the display layer DPL may be empty (e.g., substantially evacuated), may be filled with a gas such as air, or may be filled with a solid filler such as resin. Alternatively, the second substrate SUB2 and the upper surface of the display layer DPL may contact each other.

The first substrate SUB1 provides a space in which the display layer DPL is disposed. The first substrate SUB1 may be an insulating substrate or a semiconductor substrate. The first substrate SUB1 may be a rigid substrate. For example, the first substrate SUB1 may include glass.

The display layer DPL may be divided into a plurality of pixels PX in a plan view. The pixels PX may include a plurality of color pixels. For example, the pixels PX may include red pixels, green pixels, and blue pixels alternately arranged.

The display layer DPL may include a circuit element layer and a light emitting element layer. The circuit element layer and the light emitting element layer may be formed on the first substrate SUB1 or may be separately manufactured and then attached onto the first substrate SUB1.

The light emitting element layer is driven on a pixel-by-pixel basis by the circuit element layer and includes light emitting elements to emit light according to a driving current. A direction in which the light emitting element layer emits light is not necessarily limited to the direction described herein, but FIG. 3 illustrates a case where top emission light emitting elements emitting light toward the first side in the third direction DR3, which is a direction in which an upper surface of the first substrate SUB1 faces, are applied. In the current embodiment, the display screen is viewed from above the display device 1 based on FIG. 3.

The second substrate SUB2 is disposed on the display layer DPL to protect the display layer DPL. The second substrate SUB2 may be an encapsulation substrate that prevents moisture permeation or gas inflow. Since the second substrate SUB2 is placed in a display direction of the display layer DPL, a transparent insulating substrate is applied. For example, the second substrate SUB2 may include glass.

The sealing SEAL is disposed at an edge portion of the first substrate SUB1 and the second substrate SUB2 to bond them together. The sealing SEAL may have a sealing function to prevent moisture permeation or gas inflow in a lateral direction of the display panel PNL. The sealing SEAL may include, for example, frit, a photocurable resin, or a thermosetting resin.

An inner space defined by the first substrate SUB1, the second substrate SUB2, and the sealing SEAL may be sealed. The display layer DPL may be disposed in the sealed inner space.

The lens array LAR is attached onto the upper surface of the second substrate SUB2 through the bonding PSA. A surface of each lens LNS of the lens array LAR faces the first side in the third direction DR3.

Figure 4:
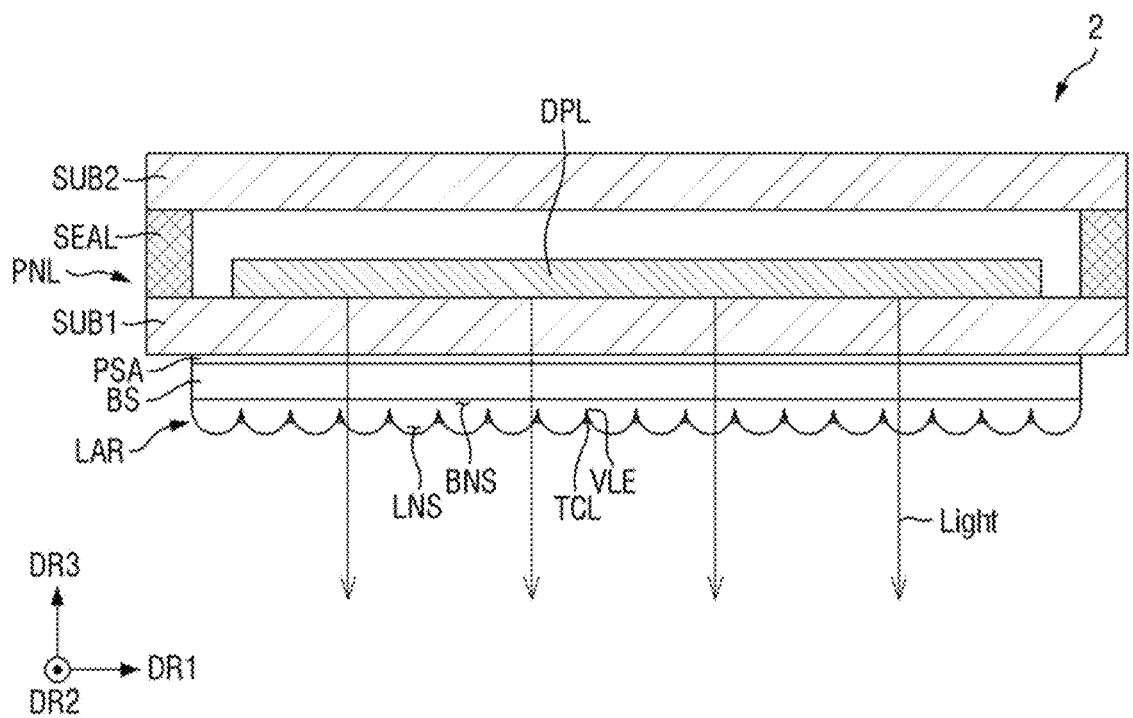
FIG. 4 is a cross-sectional view of a display device according to an embodiment of the present disclosure.

FIG. 4 is a cross-sectional view of a display device 2 according to an embodiment of the present disclosure.

Referring to FIG. 4, the display device 2 is different from what is shown in FIG. 3 in that light emitting elements of a display layer DPL are bottom emission light emitting elements emitting light toward a second side in the third direction DR3 which is a direction toward a lower surface of a first substrate SUB1. In the current embodiment, a display screen is viewed from under the display device 2 based on FIG. 3.

Since light emitted from the display layer DPL is output through the first substrate SUB1, the first substrate SUB1 is made of a transparent substrate. For example, the first substrate SUB1 may include glass.

A lens array LAR is attached onto the lower surface of the first substrate SUB1. A surface of each lens LNS of the lens array LAR faces the second side in the third direction DR3.

Figure 5:
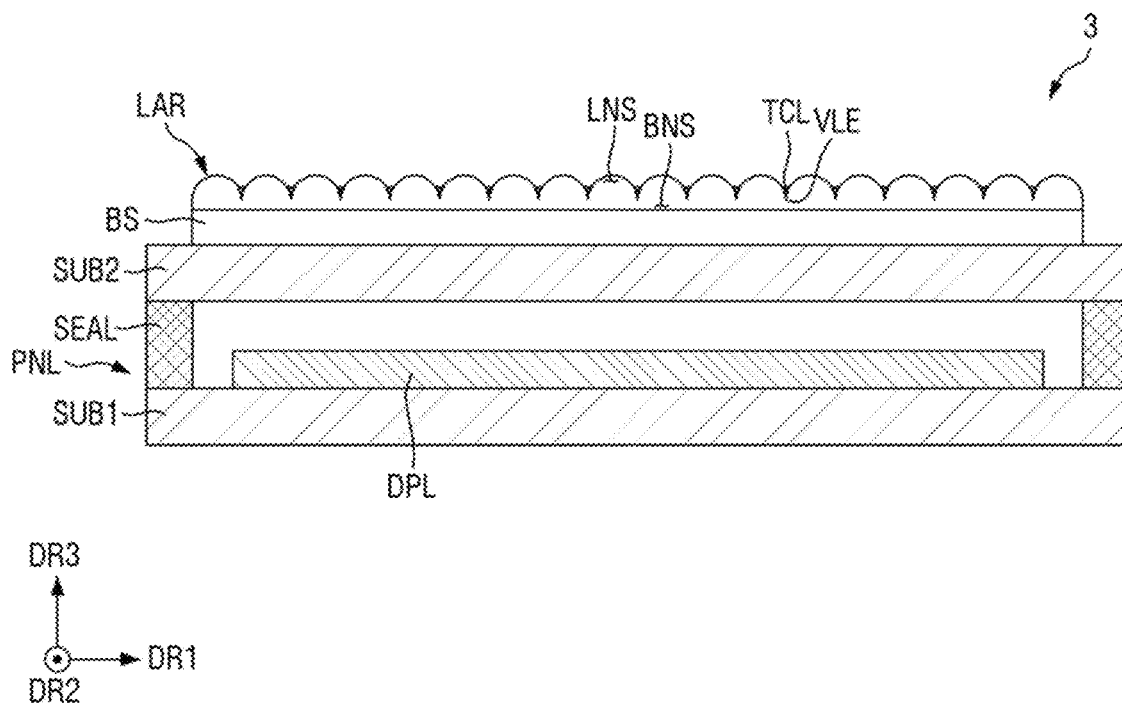
FIG. 5 is a cross-sectional view of a display device according to an embodiment of the present disclosure.

FIG. 5 is a cross-sectional view of a display device 3 according to an embodiment of the present disclosure.

Referring to FIG. 5, the display device 3 according to the current embodiment shows that a lens array LAR can be directly disposed on a surface of a display panel PNL without a bonding PSA. For example, the lens array LAR may be directly formed on a surface of a second substrate SUB2. In some cases, a base BS of the lens array LAR may be omitted, and a pattern layer PT including lenses LNS may be directly disposed on the surface of the second substrate SUB2.

Figure 6:
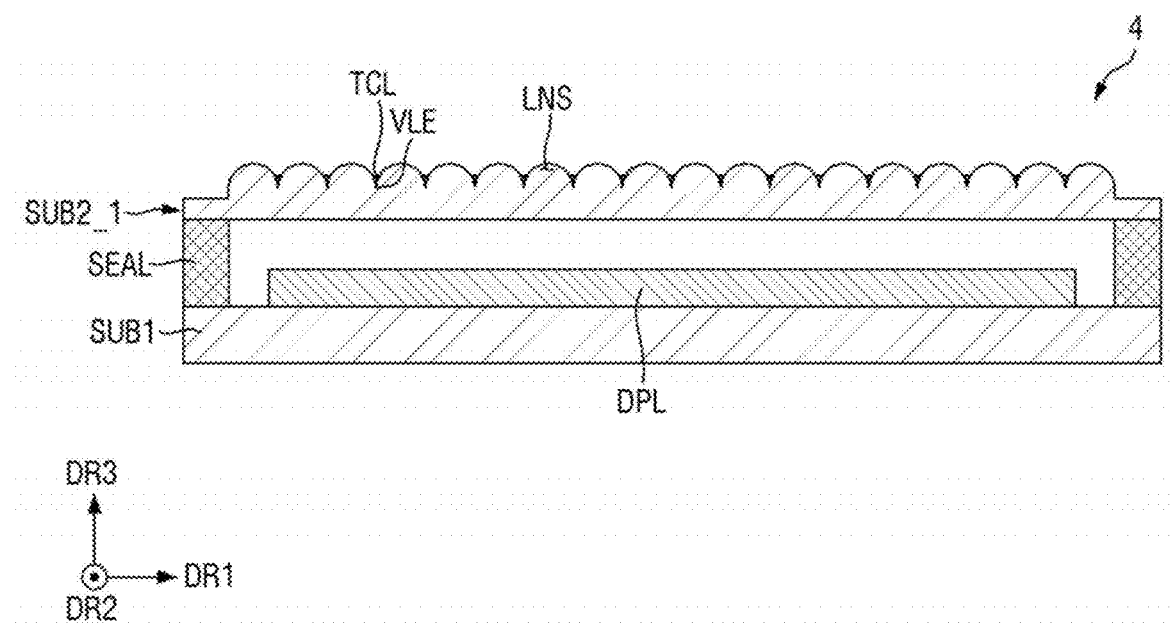
FIG. 6 is a cross-sectional view of a display device according to an embodiment of the present disclosure.

FIG. 6 is a cross-sectional view of a display device 4 according to an embodiment of the present disclosure.

Referring to FIG. 6, the display device 4 is different from that shown in FIG. 3 in that a surface of a second substrate SUB2_1 includes a plurality of lenses LNS. For example, as illustrated, the lenses LNS may be formed by processing the surface of the second substrate SUB2_1. Then, a light transmission characteristic control layer TCL may be formed on each lens valley VLE. As a result, the display device 4 may be manufactured as illustrated in FIG. 6. In the current embodiment, since the second substrate SUB2_1 itself is used as a lens array LAR, components can be simplified, and a transmittance increasing effect can be obtained by the omission of components.

Figure 7:
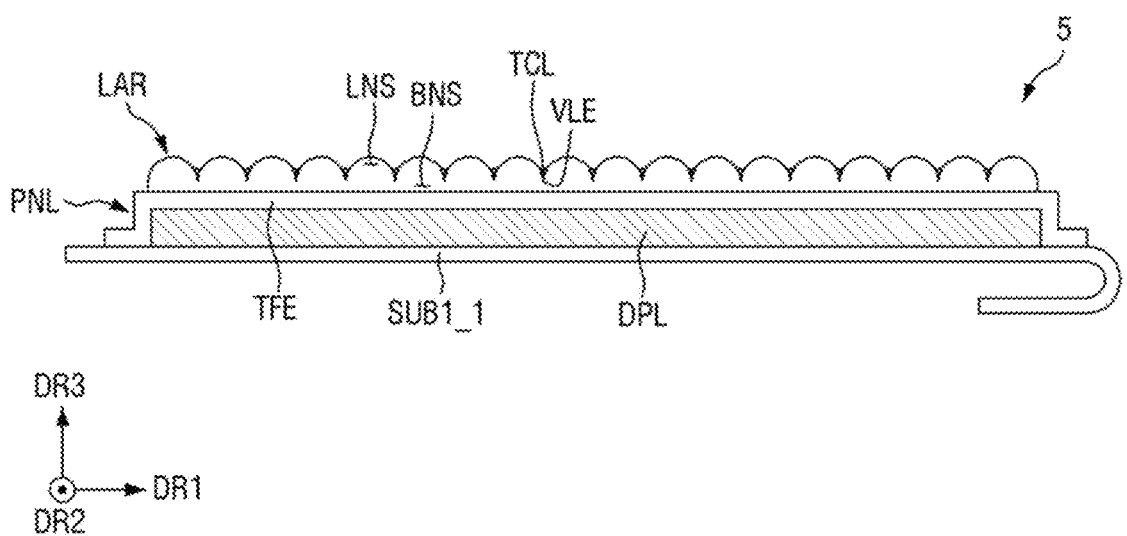
FIG. 7 is a cross-sectional view of a display device according to an embodiment of the present disclosure.

FIG. 7 is a cross-sectional view of a display device 5 according to an embodiment of the present disclosure. FIG. 7 shows that the display device 5 may be a flexible display device.

Referring to FIG. 7, a first substrate SUB1_1 of a display panel PNL may have flexible characteristics. For example, the first substrate SUB1_1 may be curved, bent, folded, rolled, stretched, etc. to an observable degree without sustaining cracking or other damage. The first substrate SUB1_1 may be made of, for example, an insulating material such as polymer resin. The polymer material may be, for example, polyethersulphone (PES), polyacrylate (PA), polyarylate (PAR), polyetherimide (PEI), polyethylene napthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof.

An end of the first substrate SUB1_1 may be bent downward as illustrated in the drawing. Drivers may be disposed on a bent portion of the first substrate SUB1_1. Such a bending structure of the display panel PNL may help to reduce a width of a non-display area of the display device 5, in other words, a width of a bezel.

A display layer DPL is disposed on a surface of the first substrate SUB1_1. A thin-film encapsulation layer TFE is disposed on the display layer DPL to replace the second substrate SUB2 of FIG. 3. In the current embodiment, since the second substrate SUB2 is omitted, a sealing SEAL may also be omitted.

The thin-film encapsulation layer TFE may include one or more inorganic layers and/or one or more organic layers. An upper surface of the thin-film encapsulation layer TFE may be flat.

A lens array LAR is disposed on the upper surface of the thin-film encapsulation layer TFE. In the drawing, a base BS of the lens array LAR is omitted, and a pattern layer PT of the lens array LAR is directly disposed on the upper surface of the thin-film encapsulation layer TFE. The lens array LAR having this structure may be manufactured by forming the thin-film encapsulation layer TFE and then directly forming the pattern layer PT on the upper surface of the thin-film encapsulation layer TFE in a subsequent process. However, embodiments are not necessarily limited thereto, and the lens array LAR may also further include the base BS similarly to the case illustrated in FIG. 5, or the lens array LAR including the base BS may be separately manufactured and then attached onto the upper surface of the thin-film encapsulation layer TFE through a bonding PSA similarly to the case illustrated in FIG. 3.

The embodiments of FIGS. 3 through 7 described above can be variously combined with each other. For example, the lens array structures of FIGS. 5 and 6 may be combined with the bottom emission structure of FIG. 4.

A relationship between a lens array LAR and pixels PX of a display panel PNL will now be described in detail with reference to FIG. 8.

Figure 8:
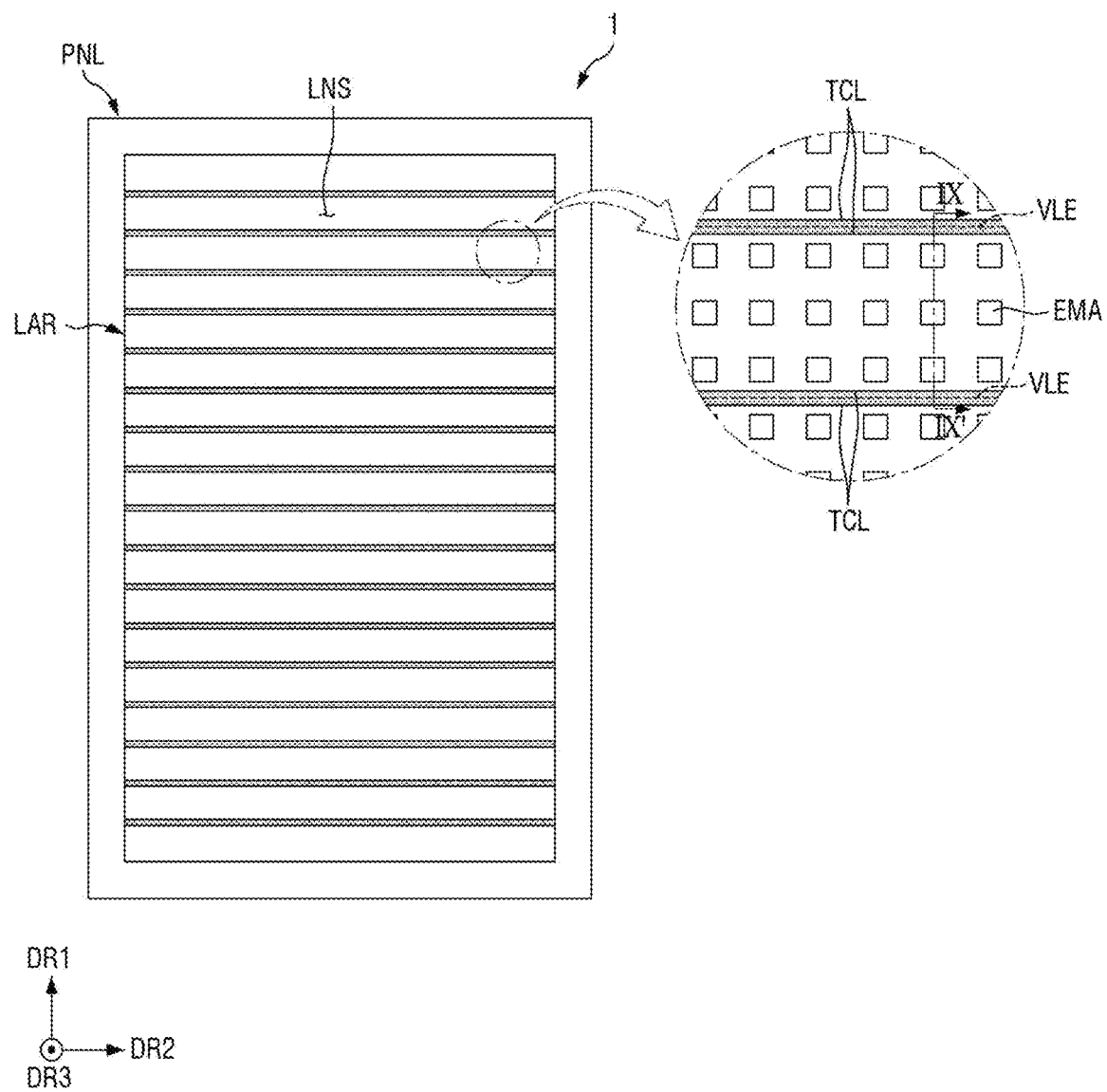
FIG. 8 is a plan view of a display device according to an embodiment of the present disclosure.

FIG. 8 is a plan view of a display device 1 according to an embodiment of the present disclosure.

Referring to FIG. 8, each lens LNS may cover a plurality of pixels PX. Each lens LNS may cover the pixels PX not only in the second direction DR2 in which it extends but also in the first direction DR1 which is a width direction of the lens LNS. In FIG. 8, each lens LNS covers three pixels PX in the width direction, but the number of the pixels PX covered by each lens LNS is not necessarily limited to three.

Each pixel PX of a display area DPA may include an emission area EMA. The emission areas EMA of the pixels PX are arranged in a matrix. The emission areas EMA may be arranged at regular intervals over the entire display area DPA regardless of the placement of a lens array LAR. Here, the expression "the emission areas EMA are arranged at regular intervals" encompasses not only a case where all the emission areas EMA are arranged at equal intervals but also a case where the emission areas EMA are arranged with a certain regularity. For example, even when a red pixel PX is spaced apart from an adjacent green pixel PX by a first distance and spaced apart from an adjacent blue pixel PX by a second distance different from the first distance, if this spacing relationship is maintained throughout the display area DPA, it can be interpreted that the pixels PX are arranged at regular intervals.

Each lens valley VLE of the lens array LAR is disposed in a space between rows of the pixels PX. The lens valleys VLE might not overlap the emission areas EMA. A distance in the first direction DR1 between the emission areas EMA with a lens valley VLE interposed between them may be the same as a distance in the first direction DR1 between adjacent emission areas EMA included in one lens LNS.

A light transmission characteristic control layer TCL overlaps each lens valley VLE in a plan view. The light transmission characteristic control layer TCL may extend in the second direction DR2, and both edges located in the first direction DR1, which is the width direction, may have an axisymmetric relationship with respect to a lens valley VLE. For example, a first edge and a second edge of the light transmission characteristic control layer TCL may be spaced apart from the lens valley VLE by equal distances.

The light transmission characteristic control layer TCL might also not overlap the emission areas EMA. From the same point of view, a width of the light transmission characteristic control layer TCL in the first direction DR1 may be smaller than or equal to the distance between the emission areas EMA adjacent to each other in the first direction DR1.

Figure 9:
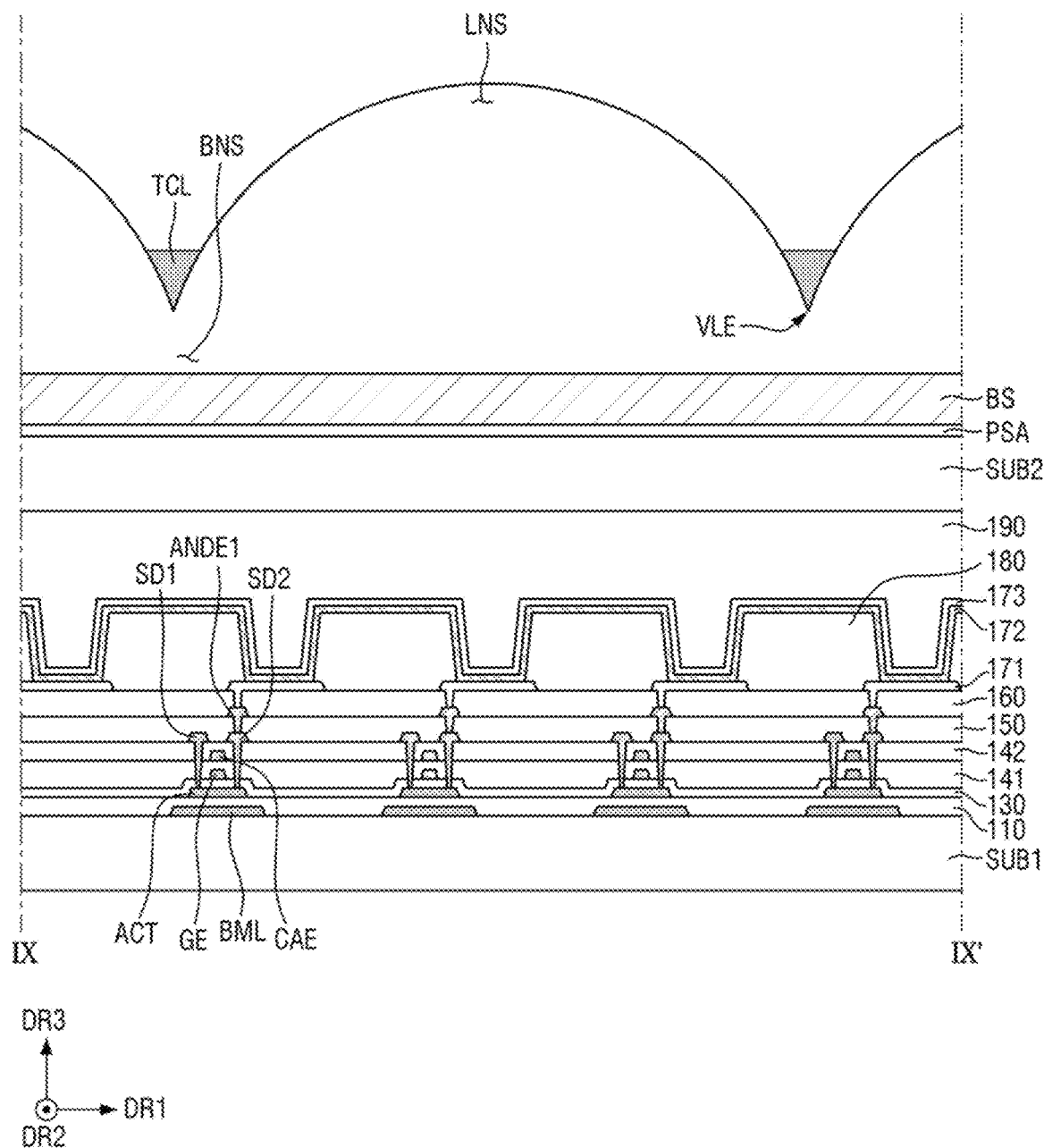
FIG. 9 is a cross-sectional view taken along line IX-IX' of FIG. 8.

FIG. 9 is a cross-sectional view taken along line IX-IX' of FIG. 8. The cross-sectional structure of the display device 1 will be described in more detail with reference to FIG. 9.

Referring to FIG. 9, light blocking layers BML are disposed on a first substrate SUB1. Each of the light blocking layers BML may have a patterned shape and may overlap a semiconductor layer ACT thereon to prevent incidence of light coming from below the light blocking layer BML to the semiconductor layer ACT.

Each of the light blocking layers BML may be a single layer or a multilayer (e.g., a layer formed of multiple distinct layers stacked upon each other) made of any one or more of molybdenum (Mo), aluminum (Al), chromium (Cr), gold (Au), titanium (Ti), nickel (Ni), neodymium (Nd), copper (Cu), and alloys thereof. Alternatively, each of the light blocking layers BML may be an organic layer including a black pigment.

A buffer layer 110 is disposed on the light blocking layers BML. The buffer layer 110 may be formed over the entire surface of the first substrate SUB1. The buffer layer 110 insulates the semiconductor layers ACT from the light blocking layers BML. The buffer layer 110 may include silicon nitride, silicon oxide, or silicon oxynitride.

The semiconductor layers ACT are disposed on the buffer layer 110. As described above, the semiconductor layers ACT may overlap the light blocking layers BML thereunder in the third direction DR3 which is the thickness direction. Each of the semiconductor layers ACT may include a first source/drain region connected to a first source/drain electrode SD1, a second source/drain region connected to a second source/drain electrode SD2, and a channel region disposed between them.

The semiconductor layers ACT may include polycrystalline silicon. In an embodiment, the semiconductor layers ACT may include monocrystalline silicon, low-temperature polycrystalline silicon, amorphous silicon, or an oxide semiconductor. The oxide semiconductor may include, for example, a binary compound (ABx), a ternary compound (ABxCy) or a quaternary compound (ABxCyDz) containing indium, zinc, gallium, tin, titanium, aluminum, hafnium (Hf), zirconium (Zr), magnesium (Mg), etc. In an embodiment, the semiconductor layers ACT may include ITZO (an oxide including indium, tin, and zinc) or IGZO (an oxide including indium, gallium, and zinc).

A gate insulating layer 130 is disposed on the semiconductor layers ACT. The gate insulating layer 130 may include a silicon compound, a metal oxide, or the like. For example, the gate insulating layer 130 may include silicon oxide, silicon nitride, silicon oxynitride, aluminum oxide, tantalum oxide, hafnium oxide, zirconium oxide, titanium oxide, or the like. These material may be used alone or in combination with each other. The gate insulating layer 130 may be a single layer or a multilayer (e.g., a layer formed of multiple distinct layers stacked upon each other) including stacked layers of different materials.

Gate electrodes GE are disposed on the gate insulating layer 130. Each of the gate electrodes GE may at least partially overlap the channel region of a semiconductor layer ACT. Each of the gate electrodes GE may be a single layer or a multilayer (e.g., a layer formed of multiple distinct layers stacked upon each other) including one or more metals selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), copper (Cu), and alloys thereof.

A first interlayer insulating layer 141 may be disposed on the gate electrodes GE. The first interlayer insulating layer 141 may be made of an inorganic layer, for example, a silicon nitride layer, a silicon oxynitride layer, a silicon oxide layer, a titanium oxide layer, or an aluminum oxide layer. The first interlayer insulating layer 141 may include a plurality of inorganic layers.

Capacitor electrodes CAE may be disposed on the first interlayer insulating layer 141. The capacitor electrodes CAE may overlap the gate electrodes GE. Each of the capacitor electrodes CAE may be a single layer or a multilayer (e.g., a layer formed of multiple distinct layers stacked upon each other) including one or more metals selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), copper (Cu), and alloys thereof.

A second interlayer insulating layer 142 may be disposed on the capacitor electrodes CAE. The second interlayer insulating layer 142 may be made of an inorganic layer, for example, a silicon nitride layer, a silicon oxynitride layer, a silicon oxide layer, a titanium oxide layer, or an aluminum oxide layer. The second interlayer insulating layer 142 may include a plurality of inorganic layers.

The first source/drain electrodes SD1 and the second source/drain electrodes SD2 may be disposed on the second interlayer insulating layer 142. Each of the first source/drain electrodes SD1 and the second source/drain electrodes SD2 may be a single layer or a multilayer (e.g., a layer formed of multiple distinct layers stacked upon each other) including one or more metals selected from aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), copper (Cu), and alloys thereof.

The first source/drain electrodes SD1 may be connected to the first source/drain regions of the semiconductor layers ACT through contact holes penetrating the gate insulating layer 130, the first interlayer insulating layer 141, and the second interlayer insulating layer 142. The second source/drain electrodes SD2 may be connected to the second source/drain regions of the semiconductor layers ACT through contact holes penetrating the gate insulating layer 130, the first interlayer insulating layer 141, and the second interlayer insulating layer 142.

The first source/drain electrodes SD1 and the second source/drain electrodes SD2 may constitute thin-film transistors together with the gate electrodes GE and the semiconductor layers ACT.

A first organic layer 150 may be disposed on the first source/drain electrodes SD1 and the second source/drain electrodes SD2 to flatten a step formed by the thin-film transistors. The first organic layer 150 may include acryl resin, epoxy resin, phenolic resin, polyamide resin, or polyimide resin.

First connection electrodes ANDE1 may be disposed on the first organic layer 150. The first connection electrodes ANDE1 may be connected to the second source/drain electrodes SD2 through contact holes penetrating the first organic layer 150. Each of the first connection electrodes ANDE1 may be a single layer or a multilayer (e.g., a layer formed of multiple distinct layers stacked upon each other) including one or more metals selected from aluminum (Al), molybdenum (Mo), platinum (Pt), palladium (Pd), silver (Ag), magnesium (Mg), gold (Au), nickel (Ni), neodymium (Nd), iridium (Or), chromium (Cr), calcium (Ca), titanium (Ti), tantalum (Ta), tungsten (W), copper (Cu), and alloys thereof.

A second organic layer 160 may be disposed on the first connection electrodes ANDE1. The second organic layer 160 may be made of an organic layer such as acrylic resin, epoxy resin, phenolic resin, polyamide resin, or polyimide resin.

Pixel electrodes 171 are disposed on the second organic layer 160. One pixel electrode 171 may be disposed in each pixel PX. The pixel electrodes 171 may be electrically connected to the first connection electrodes ANDE1 of the thin-film transistors through contact holes (or via holes) penetrating the second organic layer 160. The pixel electrodes 171 may serve as anodes of light emitting elements.

The pixel electrodes 171 may have, but are not necessarily limited to, a stacked structure in which a material layer having a high work function such as indium tin oxide (ITO), indium zinc oxide (IZO), zinc oxide (ZnO) or indium oxide ($In_2O_3$) and a reflective material layer such as silver (Ag), magnesium (Mg), aluminum (Al), platinum (Pt), lead (Pd), gold (Au), nickel (Ni), neodymium (Nd), iridium (Ir), chromium (Cr), lithium (Li), calcium (Ca) or a mixture thereof are stacked. The material layer having a high work function may be disposed on the reflective material layer so that it is disposed close to an intermediate layer 172. The pixel electrodes 171 may have, but are not necessarily limited to, a multilayer (e.g., a layer formed of multiple distinct layers stacked upon each other) structure of ITO/Mg, ITO/MgF, ITO/Ag, or ITO/Ag/ITO.

A pixel defining layer 180 is disposed on the pixel electrodes 171. The pixel defining layer 180 defines the emission areas EMA. The pixel defining layer 180 includes openings that at least partially expose the pixel electrodes 171. The openings of the pixel defining layer 180 may define the emission areas EMA.

The pixel defining layer 180 may include an organic insulating material such as polyacrylates resin, epoxy resin, phenolic resin, polyamides resin, polyimides resin, unsaturated polyesters resin, polyphenylenethers resin, polyphenylenesulfides resin, or benzocyclobutene (BCB). The pixel defining layer 180 may also include an inorganic material. In addition, the pixel defining layer 180 may include a stacked layer of an inorganic layer and an organic layer.

The intermediate layer 172 is disposed in the openings of the pixel defining layer 180. The intermediate layer 172 may include an organic light emitting layer. The intermediate layer 172 may further include a hole injection/transport layer disposed under the organic light emitting layer and/or an electron injection/transport layer disposed on the organic light emitting layer. At least a portion of the intermediate layer 172 may extend on an upper surface of the pixel defining layer 180 as well as the openings of the pixel defining layer 180. Further, at least a portion of the intermediate layer 172 may be connected as a whole regardless of the pixels PX. In an embodiment, each of the hole injection/transport layer and the electron injection/transport layer may be a common layer connected as a whole regardless of the pixels PX, and the organic light emitting layer may be disposed only in each opening of the pixel defining layer 180 and may be separate for each pixel PX.

A common electrode 173 is disposed on the intermediate layer 172. The common electrode 173 may be integrally connected as a whole regardless of the pixels PX. The common electrode 173 may serve as cathodes of the light emitting elements.

The common electrode 173 may include, but is not necessarily limited to, a material layer having a small work function, such as Li, Ca, LiF/Ca, LiF/Al, Al, Mg, Ag, Pt, Pd, Ni, Au Nd, Ir, Cr, BaF, Ba, or a compound or mixture thereof (e.g., a mixture of Ag and Mg). The common electrode 173 may further include a transparent metal oxide layer disposed on the material layer having a small work function.

A second substrate SUB2 is spaced apart from the common electrode 173 by a predetermined distance to face the common electrode 173. A filler 190 may be disposed between the common electrode 173 and the second substrate SUB2. The filler 190 may be made of a material having a buffer function. For example, the filler 190 may be made of an organic layer such as acryl resin, epoxy resin, phenolic resin, polyamide resin, or polyimide resin.

The lens array LAR is attached to an upper surface of the second substrate SUB2 by a bonding PSA. Each lens LNS of the lens array LAR covers three emission areas EMA. As illustrated in the drawing, the lens valleys VLE overlap the pixel defining layer 180 and do not overlap the emission areas EMA. In addition, the light transmission characteristic control layers TCL overlap the pixel defining layer 180 and do not overlap the emission areas EMA.

Figure 10:
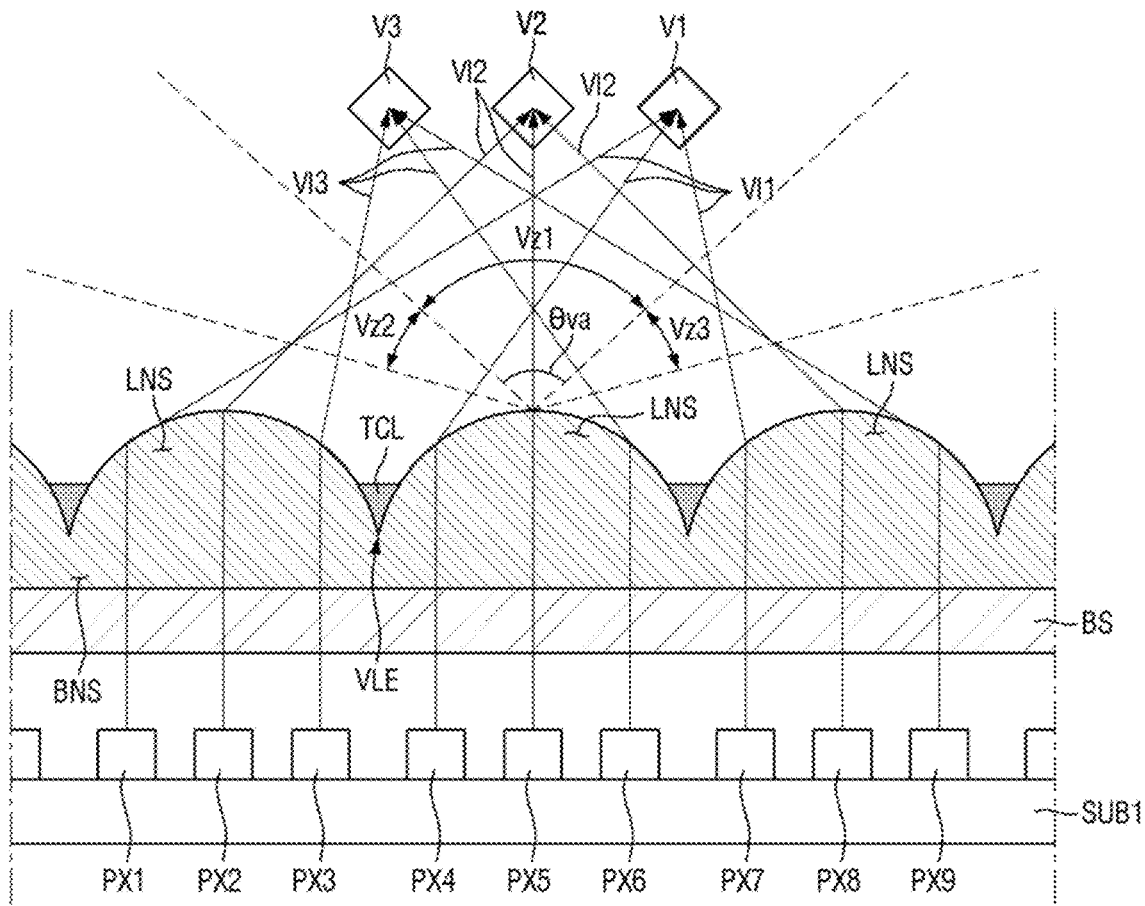
FIG. 10 is a schematic diagram illustrating a light directing path of a display device according to an embodiment of the present disclosure.

FIG. 10 is a schematic diagram illustrating a light directing path of a display device 1 according to an embodiment of the present disclosure. In FIG. 10, the structure of a display panel PNL is schematically illustrated for ease of description. Pixels PX1 through PX9 illustrated in FIG. 10 specifically represent emission areas EMA thereof.

Referring to FIG. 10, a first pixel PX1, a fourth pixel PX4, and a seventh pixel PX7, each being located on a side of the center of a lens LNS, may provide a first view image VI1. A second pixel PX2, a fifth pixel PX5, and an eighth pixel PX8, each being located at the center of the lens LNS, may provide a second view image VI2. A third pixel PX3, a sixth pixel PX6, and a ninth pixel PX9, each being located on the other side of the center of the lens LNS, may provide a third view image VI3.

The first view image VI1, the second view image VI2, and the third view image VI3 may be displayed in separate spaces on a front surface of the display device 1. The first view image VI1, the second view image VI2, and the third view image VI3 may be refracted by the lenses LNS and respectively provided to a first view area V1, a second view area V2 and a third view area V3 in front of the display device 1. For example, as illustrated in FIG. 10, the second view area V2 may be located in a middle area of the display device 1, the first view area V1 may be located in a right area of the display device 1, and the third view area V3 may be located in a left area of the display device 1.

The first view image VI1, the second view image VI2, and the third view image VI3 may be images generated in consideration of binocular disparity. When a user's left and right eyes are located in different view areas among the first view area V1, the second view area V2 and the third view area V3, the user may feel a 3D effect due to binocular disparity.

In some embodiments, the display device 1 may include a plurality of viewing zones VZ1 through VZ3. Each of the viewing zones VZ1 through VZ3 may refer to an area in which one stereoscopic image can be viewed naturally without interruption within a specific viewing angle range Ova. For example, the viewing zones VZ1 through VZ3 may include a first viewing zone VZ1 located in the middle area of the display device 1, a second viewing zone VZ2 located in the left area of the display device 1, and a third viewing zone VZ3 located in the right area of the display device 1.

The first viewing zone VZ1, the second viewing zone VZ2, and the third viewing zone VZ3 may provide different images, respectively. For example, the first viewing zone VZ1, the second viewing zone VZ2, and the third viewing zone VZ3 may provide images of an object viewed from a first angle, a second angle, and a third angle, respectively. Alternatively, the first viewing zone VZ1, the second viewing zone VZ2, and the third viewing zone VZ3 may respectively provide a navigation image, an image displaying vehicle information, and an entertainment image such as a movie.

A first view area V1, a second view area V2, and a third view area V3 may constitute at least some of a plurality of view areas in the first viewing zone VZ1. For example, when there are N view areas in the first viewing zone VZ1, the first view area V1 may be a first view area located on the leftmost side, the third view area V3 may be an $N^{th}$ view area located on the rightmost side, and the second view area V2 may be an $((N+1)/2)^{th}$ view area located at the center.

Although the pixels PX are illustrated in FIG. 10 as providing three view images VI1 through VI3 to three view areas V1 through V3 for ease of description, the present disclosure is not necessarily limited thereto. The display device 1 may further include a plurality of pixels PX providing additional view images, view areas and/or viewing zones other than the view images VI1 through VI3, the view areas V1 through V3, and the viewing zones VZ1 through VZ3 illustrated in FIG. 10. The number of the pixels PX providing view images, the number of the view images VI1 through V13, and the number of the view areas V1 through V3 and the viewing zones VZ1 through VZ3 can be variously changed according to the design of the display device 1.

Figure 11:
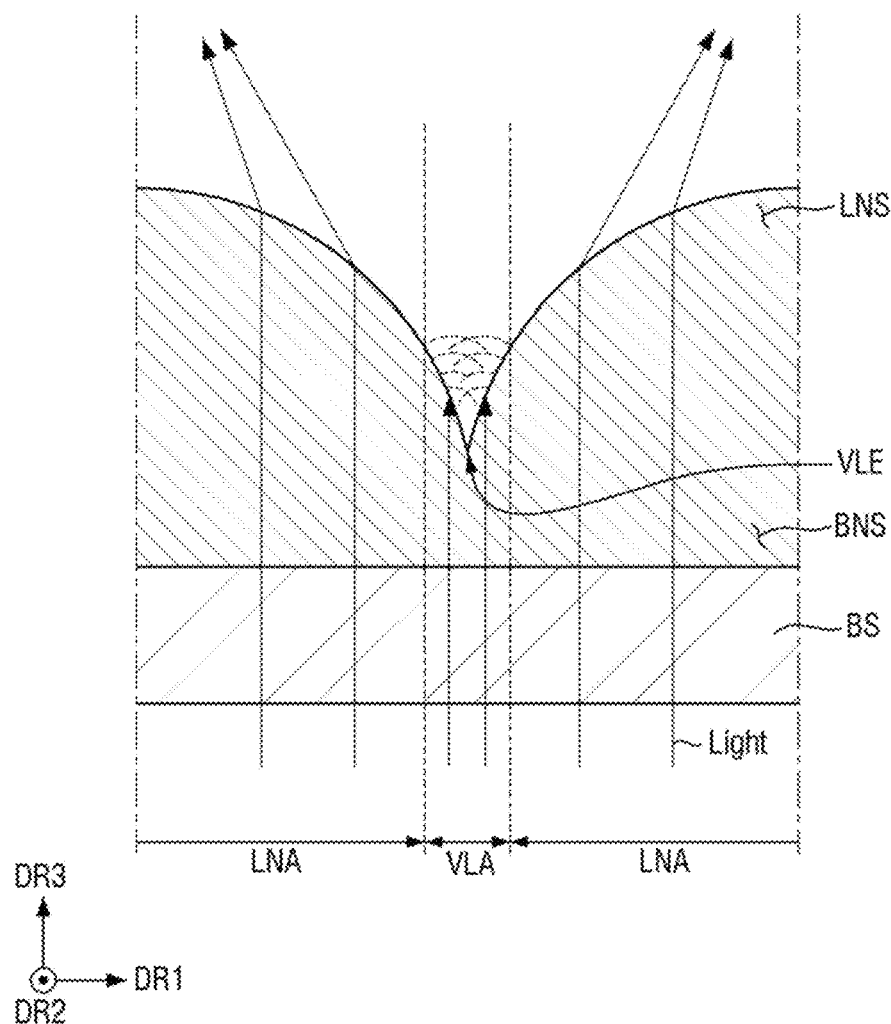
FIG. 11 is a schematic diagram illustrating a light directing path of a lens array according to embodiments of the present disclosure.

FIG. 11 is a schematic diagram illustrating a light directing path of a lens array LAR according to embodiments. FIG. 11 illustrates a light directing path when the lens array LAR does not include a light transmission characteristic control layer TCL.

Referring to FIG. 11, each lens LNS of the lens array LAR may be divided into a first area LNA and a second area VLA. The second area VLA is located in a boundary area of each lens LNS in which a lens valley VLE is located. The second area VLA may have a predetermined width on both sides of the lens valley VLE. The first area LNA is an area other than the second area VLA and corresponds to a non-boundary area.

Light passing through the first area LNA of each lens LNS is refracted and directed according to the surface shape of the lens LNS. The refraction of light through each lens LNS may follow Snell's law. As illustrated, the first area LNA of a lens LNS adjacent to a side of the lens valley VLE and the first area LNA of a lens LNS adjacent to the other side of the lens valley VLE may output light substantially symmetrically with respect to the lens valley VLE.

A horizontal distance between the two adjacent lenses LNS increases toward an upper side. The horizontal distance between the adjacent lenses LNS decreases toward a lower side to become zero at the lens valley VLE. Therefore, a section in which the horizontal distance between the adjacent lenses LNS is very small exists in an area adjacent to the lens valley VLE. In this section in which the distance between the lenses LNS is small, diffraction and/or spherical aberration may occur. The second area VLA corresponds to this section. When diffraction or spherical aberration occurs in the second area VLA, light might not be directed as designed by the shape of the lenses LNS. When light is directed abnormally, crosstalk corresponding to a ratio of a leak signal to a normal signal may increase, thereby deteriorating image quality, for example, by the displayed image appearing out of focus.

Figure 12:
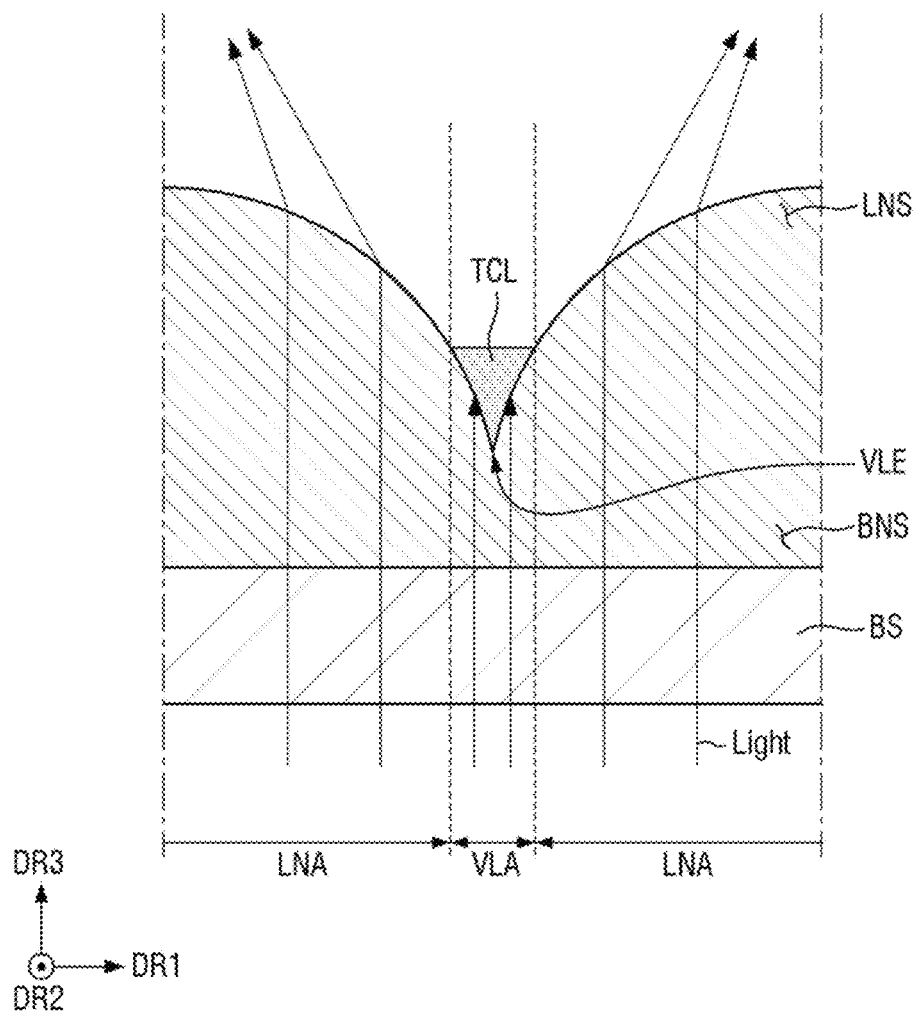
FIG. 12 is a schematic diagram illustrating a light directing path of a lens array according to an embodiment of the present disclosure.
Figure 13:
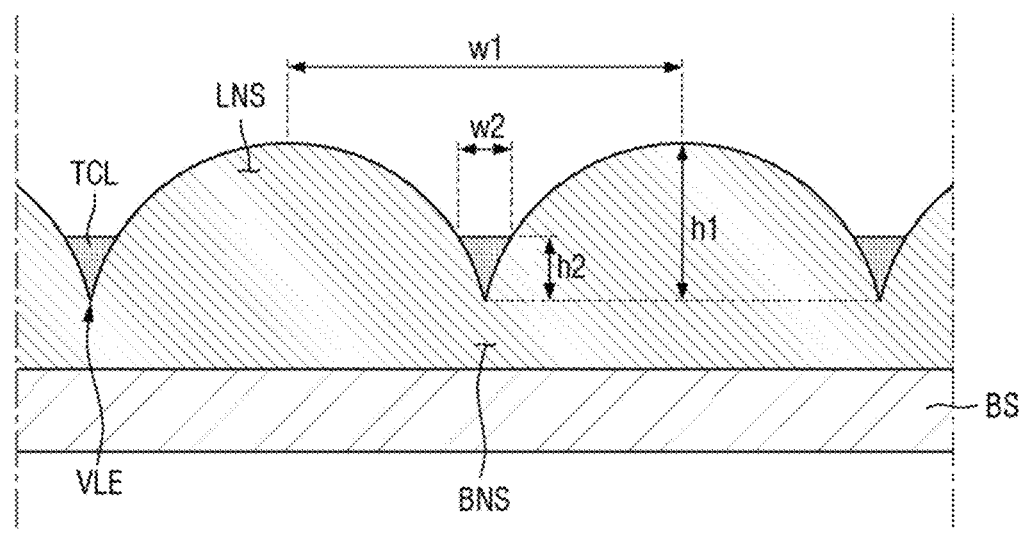
FIG. 13 is a cross-sectional view of the lens array according to the embodiment of the present disclosure shown in FIG. 12.
Figure 13:
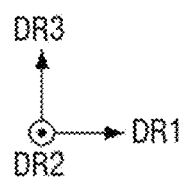

FIG. 12 is a schematic diagram illustrating a light directing path of a lens array LAR according to an embodiment of the present disclosure. FIG. 13 is a cross-sectional view of the lens array LAR according to the embodiment of the present disclosure.

A light transmission characteristic control layer TCL will now be described in detail with reference to FIGS. 12 and 13.

Referring to FIG. 12, the light transmission characteristic control layer TCL is disposed on a lens valley VLE. The light transmission characteristic control layer TCL may absorb at least a portion of incident light. Therefore, since the amount of light emitted forward through a second area VLA is reduced, an abnormal directing phenomenon can be reduced. Accordingly, this can reduce crosstalk, thereby increasing display quality.

Referring to FIGS. 12 and 13, a solid-phase refractive index of the light transmission characteristic control layer TCL may be less than or equal to a solid-phase refractive index of a pattern layer PT of the lens array LAR, but may be similar in magnitude to the solid-phase refractive index of the pattern layer PT. For example, the solid-phase refractive index of the light transmission characteristic control layer TCL may be 0.9 to 1 times the solid-phase refractive index of the pattern layer PT of the lens array LAR. In an embodiment, the solid-phase refractive index of the pattern layer PT of the lens array LAR may be 1.67, and the solid-phase refractive index of the light transmission characteristic control layer TCL may be selected within the range of about 1.52 to about 1.65.

The light transmission characteristic control layer TCL may include a light absorbing material. The light absorbing material is a main factor that absorbs light passing through the light transmission characteristic control layer TCL. The light transmission characteristic control layer TCL may further include a resin. The light absorbing material may be dispersed and distributed within the resin.

The resin of the light transmission characteristic control layer TCL may be a photocurable resin. However, the present disclosure is not necessarily limited thereto, and the resin of the light transmission characteristic control layer TCL may also be a thermosetting resin.

The concentration of the light absorbing material in the light transmission characteristic control layer TCL, an extinction coefficient of the light absorbing material, and a thickness of the light transmission characteristic control layer TCL are factors that determine the transmittance of the light transmission characteristic control layer TCL.

The following equation may be established according to the Beer-Lambert law.

$$I_t/I_0 = 10^{-\varepsilon c l},$$

where $I_1$ is the light intensity of transmitted light, $I_0$ is the light density of incident light, $\varepsilon$ is the extinction coefficient of the light transmission characteristic control layer TCL, c is the concentration of the light absorbing material in the light transmission characteristic control layer TCL, and l is the thickness of the light transmission characteristic control layer TCL. In the above equation, $I_t/I_0$ on the left side means transmittance T. Therefore, the transmittance T may decrease as the extinction coefficient e increases, the concentration c of the light absorbing material increases, and the thickness l of the light transmission characteristic control layer TCL increases. Since a decrease in the transmittance T means a decrease in the amount of light emitted through the light transmission characteristic control layer TCL, the abnormal directing phenomenon occurring in a corresponding area may decrease as the transmittance T decreases. However, it might not be easy to increase all factors at the same time in a process. In addition, if the extinction coefficient ε is too large, curing light may be unable to pass through the whole of the light transmission characteristic control layer TCL, making it difficult to cure the light transmission characteristic control layer TCL. A range of parameters that can be stably applied in a process and can effectively prevent the abnormal directing phenomenon will now be described.

First, the thickness l of the light transmission characteristic control layer TCL is generally determined according to a width w2 of the light transmission characteristic controlling layer TCL and the shape of lenses LNS. The thickness of the light transmission characteristic control layer TCL is maximum at the center overlapping the lens valley VLE and decreases toward both edges.

The concentration c of the light absorbing material is determined in consideration of dispersibility and cohesiveness of the light absorbing material with respect to the resin. When the molar concentration c of the light absorbing material in the light transmission characteristic control layer TCL is in the range of 0.05 to 0.5 M, it is easier to control dispersibility and cohesiveness. The molar concentration c of the light absorbing material may be in the range of 0.1 M to 0.25 M. In an exemplary embodiment, the molar concentration c of the light absorbing material is set to 0.2 M.

The extinction coefficient ε of the light transmission characteristic control layer TCL (or the light absorbing material) may be in the range of $1.95 \times 10^2$ to $1.95 \times 10^3$ $M^{-1} \cdot cm^{-1}$.

When the extinction coefficient ε is smaller than $1.95 \times 10^2$ $M^{-1} \cdot cm^{-1}$, the transmittance of the light transmission characteristic control layer TCL is high. Thus, it is difficult to sufficiently suppress abnormally directed light. In addition, since the light transmission characteristic control layer TCL has a refractive index similar to that of the pattern layer PT, light passing through the light transmission characteristic control layer TCL may contribute to the formation of a double image. From this point of view, the extinction coefficient E may be $1.95 \times 10^2$ $M^{-1} \cdot cm^{-1}$ or more.

When the extinction coefficient ε is greater than $1.95 \times 10^3$ $M^{-1} \cdot cm^{-1}$, a phenomenon in which the light transmission characteristic control layer TCL is not cured may occur. The uncured light transmission characteristic control layer TCL may weaken durability of the lens array LAR. From this point of view, the extinction coefficient ε maybe $1.95 \times 10^3$ $M^{-1} \cdot cm^{-1}$ or less.

When these conditions are applied, the transmittance of the light transmission characteristic control layer TCL may have a value of 50% or less, preferably 10% or less, based on a central portion which is a thickest portion.

The light transmission characteristic control layer TCL may be directly disposed on surfaces of the lenses LNS. The light transmission characteristic control layer TCL may directly contact the surfaces of the lenses LNS.

The light transmission characteristic control layer TCL may be formed, for example, by being coated on the pattern layer PT including the lenses LNS through a jetting process, a needle application process, or the like and then being cured.

A lower surface of the light transmission characteristic control layer TCL may have a shape complementary to the surface shape of the lenses LNS. An upper surface of the light transmission characteristic control layer TCL may be flat.

The width w2 of the light transmission characteristic control layer TCL may be measured in a plan view and may be measured in cross section based on the upper surface. The width w2 of the light transmission characteristic control layer TCL may be smaller than a pitch w1 of the lenses LNS and a width of each lens LNS. Here, the pitch w1 of the lenses LNS is defined as a horizontal distance from a peak of a lens LNS to a peak of another adjacent lens LNS. The width of each lens LNS is defined as a horizontal distance from the lens valley VLE on a side of one lens LNS to the lens valley VLE on the other side of the lens LNS. The pitch w1 of the lenses LNS may be, but is not necessarily limited to, the same as the width of each lens LNS. The width of each lens LNS is greater than a width of each pixel PX and may be in the range of, but not necessarily limited to, 100 µm to 500 µm.

The width w2 of the light transmission characteristic control layer TCL may be in the range of 25% to 40% of the pitch w1 of the lenses LNS and the width of each lens LNS. Within the above range, image crosstalk can be effectively reduced. In addition, when the light transmission characteristic control layer TCL is within the above range, an area exposed without being covered by the light transmission characteristic control layer TCL in the surface of each lens LNS can be secured with a sufficient ratio. Since the surface of each lens LNS exposed by the light transmission characteristic control layer TCL is an area that performs a main light directing function, a light directing effect by the lenses LNS can be effectively maintained despite the introduction of the light transmission characteristic control layer TCL.

A stacked thickness of the light transmission characteristic control layer TCL (a distance h2 from the lens valley VLE to an edge of the upper surface in the third direction DR3; here, since the upper surface of the light transmission characteristic control layer TCL is flat, the stacked thickness h2 of the transmission characteristic control layer TCL is the same as a center thickness of the light transmission characteristic control layer TCL) may be smaller than a height of each lens LNS (a distance h1 from a base portion BS to a peak of each lens LNS). The stacked thickness h2 of the light transmission characteristic control layer TCL may be less than or equal to half of the height h1 of each lens LNS. In some embodiments, the stacked thickness h2 of the light transmission characteristic control layer TCL may be in the range of 25% to 40% of the height h1 of each lens LNS. Within this range, a transmittance suppression function of the light transmission characteristic control layer TCL and a light directing function by the lenses LNS can be effectively performed at the same time.

Hereinafter, other embodiments will be described.

Figure 14:
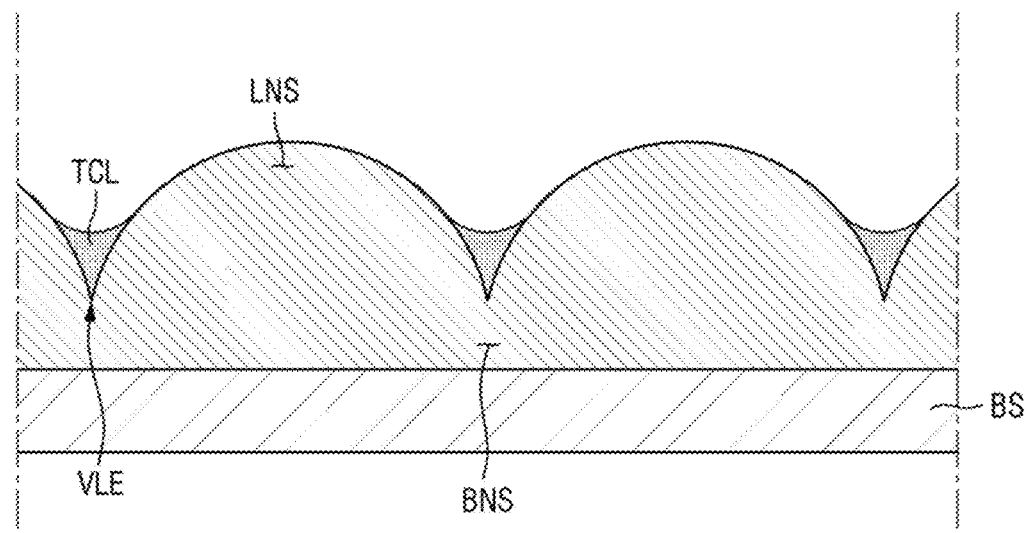
FIG. 14 is a cross-sectional view of a lens array according to an embodiment of the present disclosure.
Figure 14:
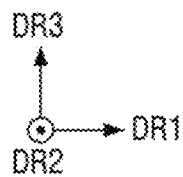
Figure 15:
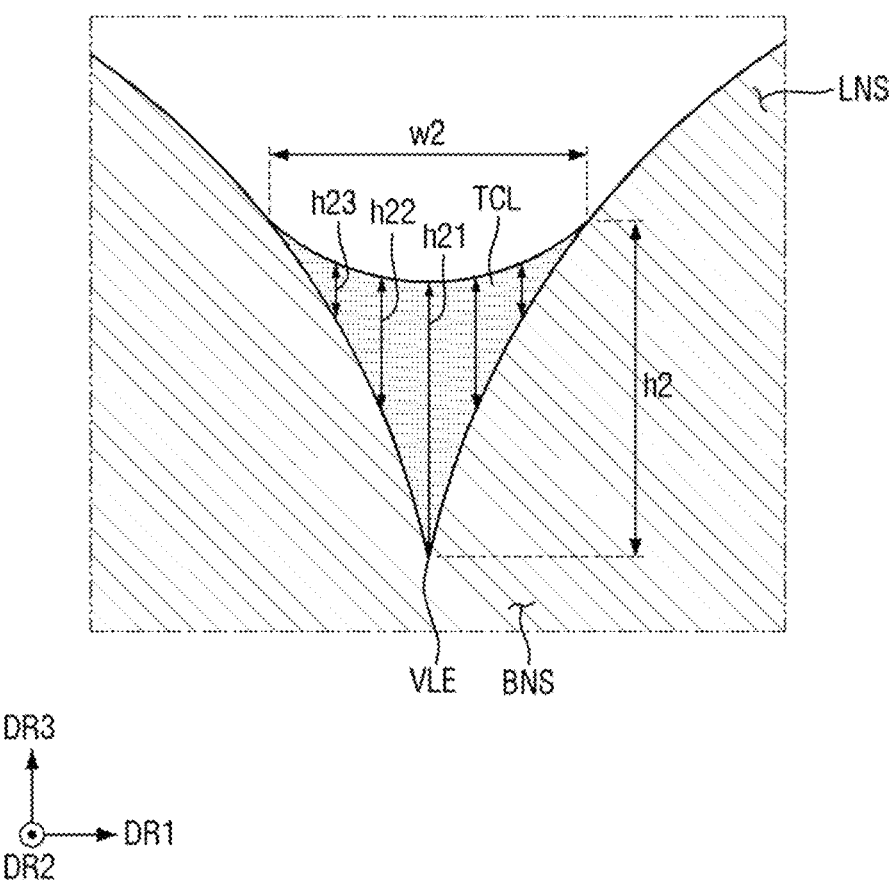
FIG. 15 is a partially enlarged view of FIG. 14.
Figure 16:
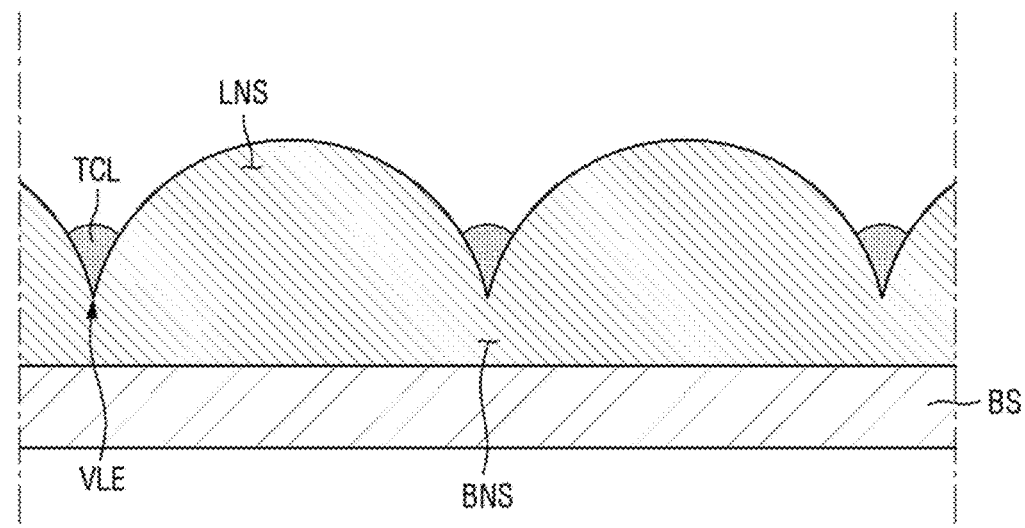
FIG. 16 is a cross-sectional view of a lens array according to an embodiment of the present disclosure.
Figure 17:
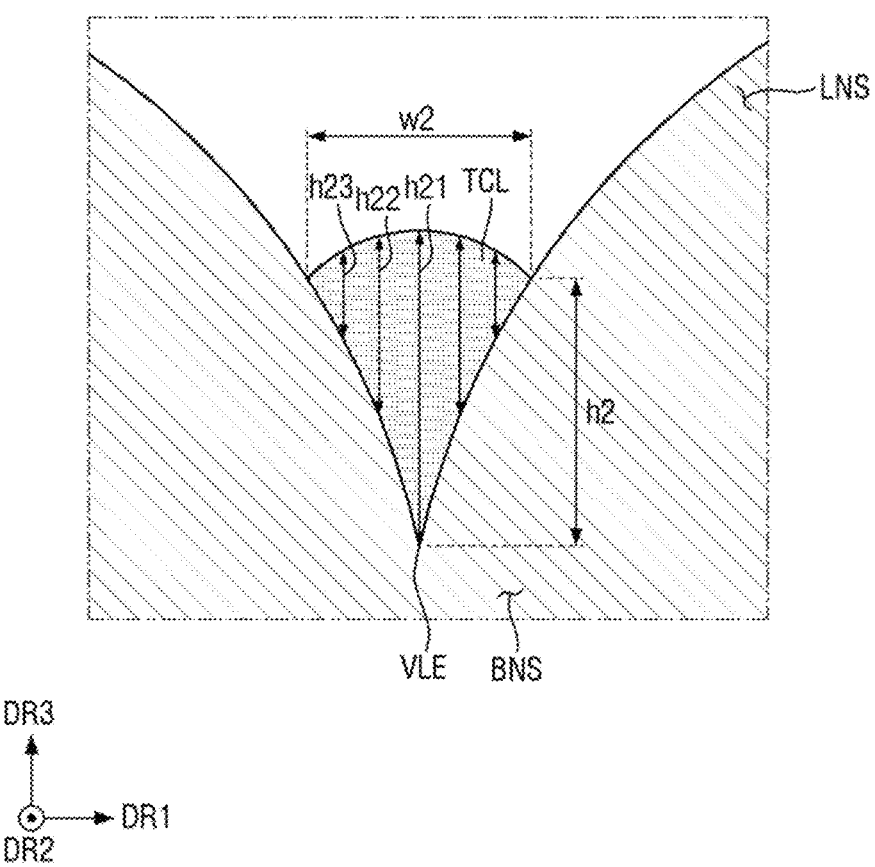
FIG. 17 is a partially enlarged view of FIG. 16.

FIG. 14 is a cross-sectional view of a lens array according to an embodiment of the present disclosure. FIG. 15 is a partially enlarged view of FIG. 14. FIG. 16 is a cross-sectional view of a lens array according to an embodiment of the present disclosure. FIG. 17 is a partially enlarged view of FIG. 16.

The embodiment of FIGS. 14 and 15 and the embodiment of FIGS. 16 and 17 show that a surface of a light transmission characteristic control layer TCL might not be flat. An upper surface of the light transmission characteristic control layer TCL may be concave as illustrated in FIGS. 14 and 15 or may be convex as illustrated in FIGS. 16 and 17 depending on surface tension or wetting property between a resin constituting the light transmission characteristic control layer TCL and a pattern layer PT.

When the surface of the light transmission characteristic control layer TCL is concave as illustrated in FIGS. 14 and 15, a central portion may be the thickest, and the thickness may decrease toward edges (h21>h22>h23) as in the embodiment of FIG. 12 but may decrease by a smaller amount toward the edges. Therefore, the embodiments of FIGS. 14 and 15 may be useful when it is intended to effectively block light in a wider range. In FIGS. 14 and 15, a center thickness h21 of the light transmission characteristic control layer TCL is smaller than a stacked thickness h2.

When the surface of the light transmission characteristic control layer TCL is convex as illustrated in FIGS. 16 and 17, the current embodiment is the same as the embodiment of FIG. 12 in that the thickness decreases toward the edges (h21>h22>h23) but is different from the embodiment of FIG. 12 in that the thickness h21 of the central portion is greater than that in FIG. 12. In the current embodiment, the center thickness h21 of the light transmission characteristic control layer TCL is greater than the stacked thickness h2. Therefore, a light blocking rate in the central portion can be further increased. The current embodiment may be useful when it is required to strongly block light within a limited width.

Figure 18:
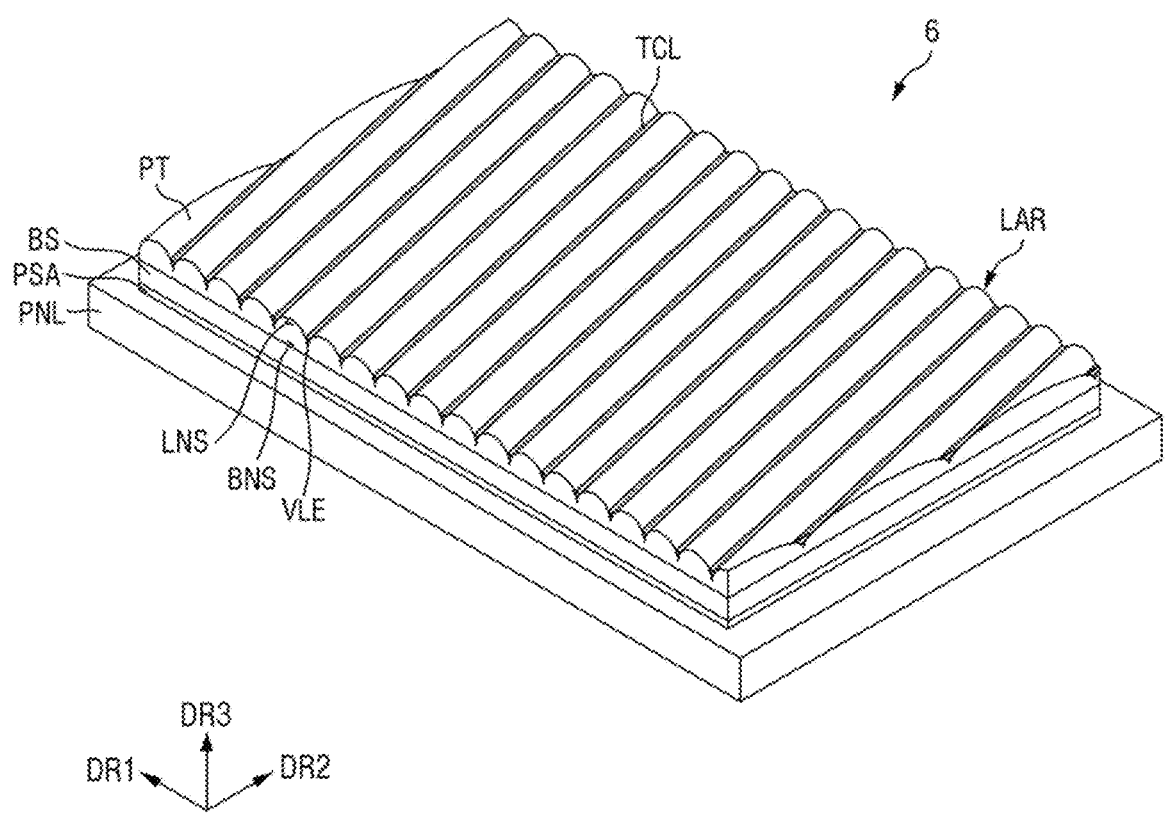
FIG. 18 is a perspective view of a display device according to an embodiment of the present disclosure.

FIG. 18 is a perspective view of a display device according to an embodiment of the present disclosure.

FIG. 18 shows that a direction in which lenses LNS of a lens array LAR extend may be tilted with respect to the second direction DR2. The extending direction of the lenses LNS is tilted not only with respect to the second direction DR2 but also with respect to the first direction DR1. A tilt angle of the extending direction of the lenses LNS with respect to the second direction DR2 is greater than 0 degrees and less than 90 degree, for example, may be, but is not necessarily limited to being, about 5 degrees to about 15 degrees. When the extending direction of the lenses LNS is tilted with respect to long sides or short sides of a display panel PNL, it may help to prevent a moiré phenomenon. In the current embodiment, like the lenses LNS, a light transmission characteristic control layer TCL disposed on each lens valley VLE also extends while being tilted with respect to the second direction DR2.

Figure 19:
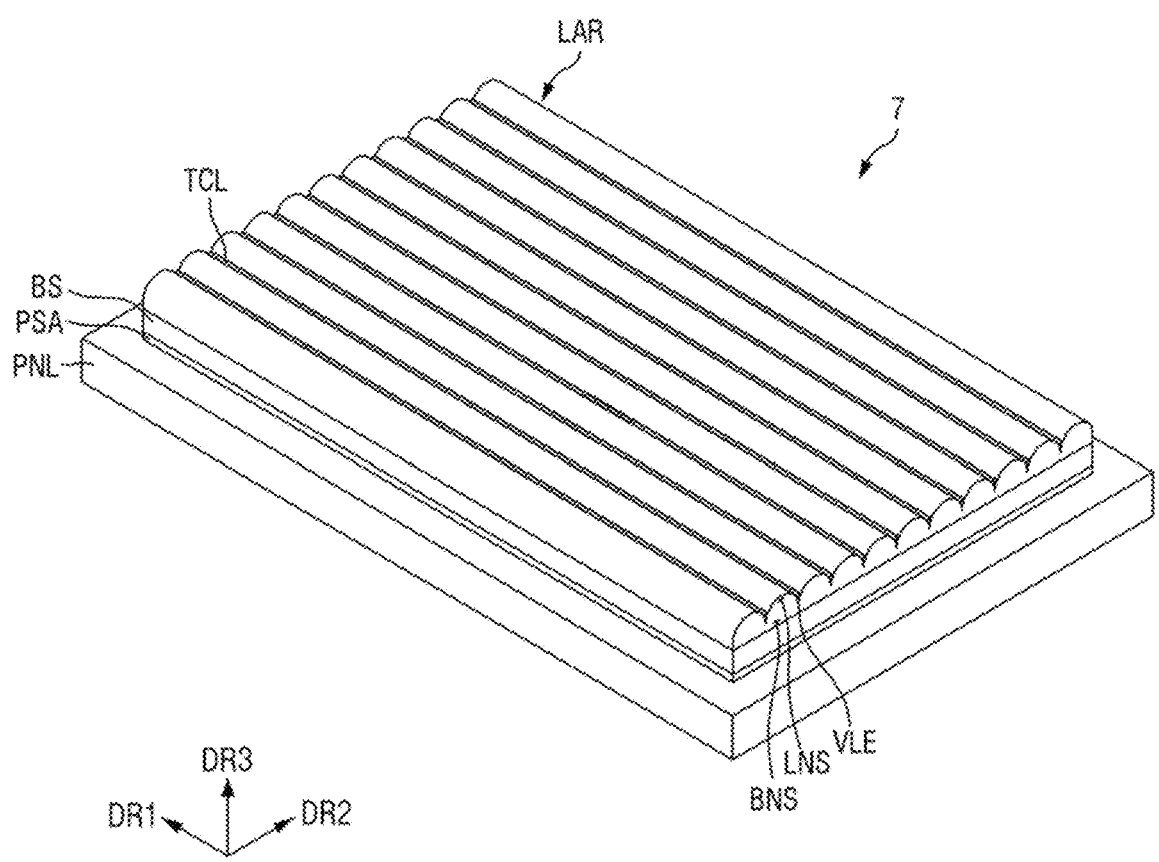
FIG. 19 is a perspective view of a display device according to an embodiment of the present disclosure.

FIG. 19 is a perspective view of a display device according to an embodiment of the present disclosure.

The embodiment of FIG. 19 is different from the embodiment of FIG. 1 in that a direction in which lenses LNS of a lens array LAR extend is the first direction DR1. In the embodiment of FIG. 1, a plurality of view areas are disposed along the first direction DR. However, in the embodiment of FIG. 19, a plurality of view areas may be distributed along the second direction DR2. Since the lenses LNS extend in the first direction DR1, it is obvious that, like the lenses LNS, a light transmission characteristic control layer TCL disposed on each lens valley VLE also extends in the first direction DR1.

Figure 20:
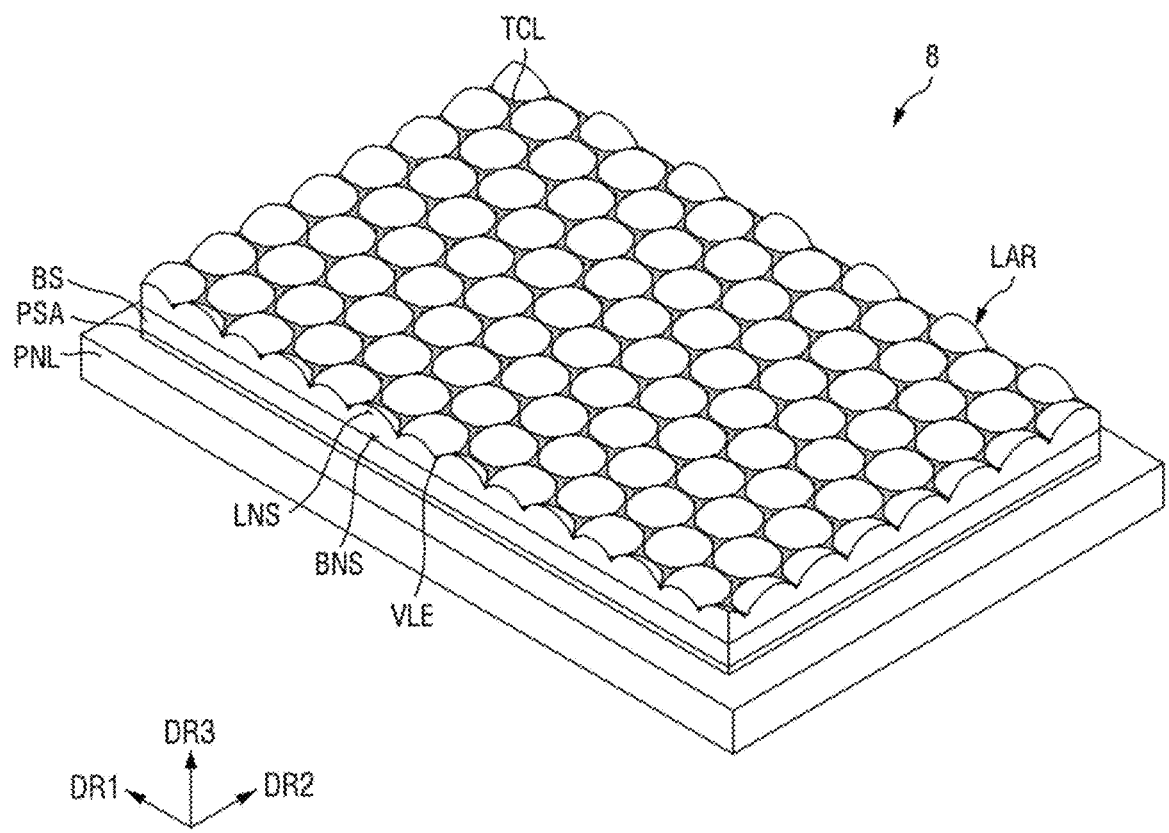
FIG. 20 is a perspective view of a display device according to an embodiment of the present disclosure.
Figure 21:
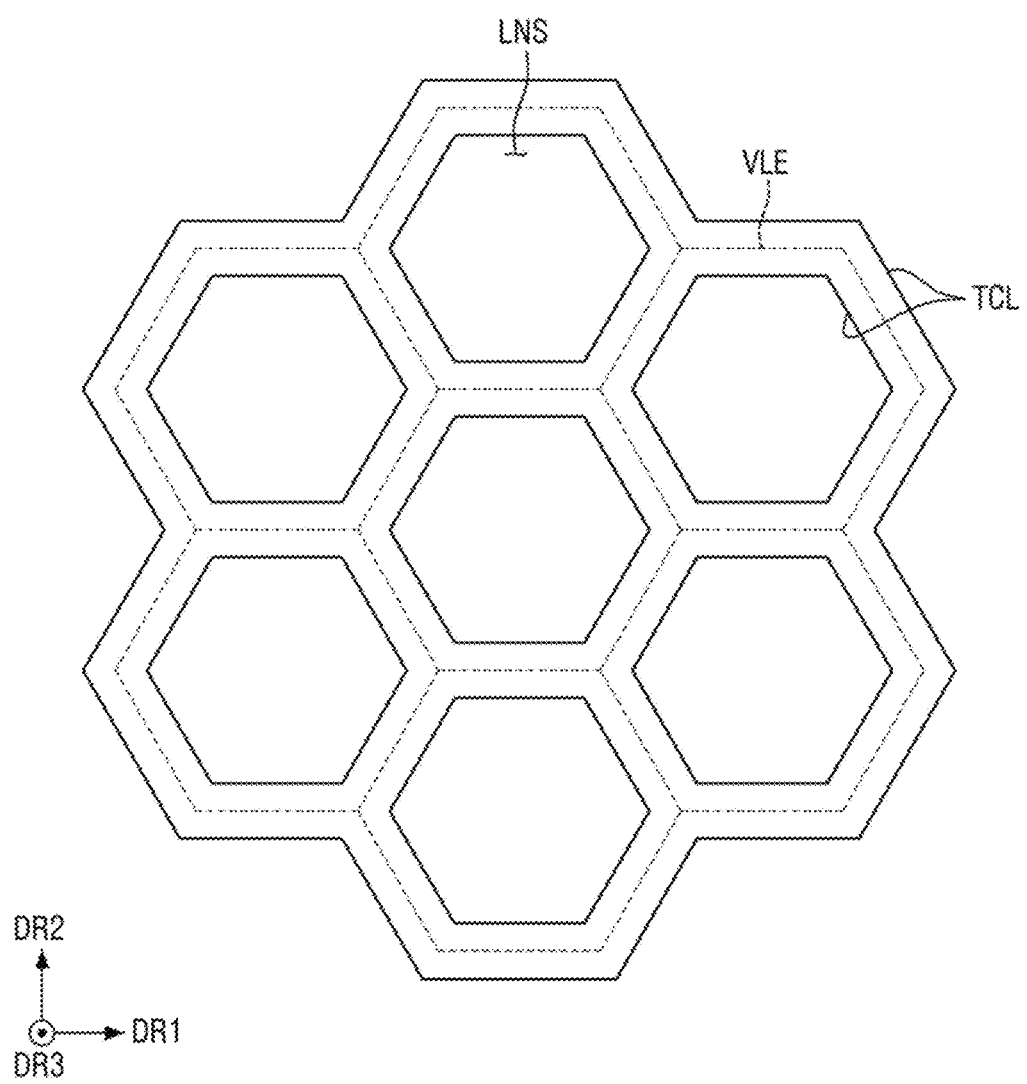
FIG. 21 is a partial plan view of a lens array of FIG. 20.

FIG. 20 is a perspective view of a display device according to an embodiment of the present disclosure. FIG. 21 is a partial plan view of a lens array LAR of FIG. 20.

Referring to FIGS. 20 and 21, the display device according to the current embodiment is different from those according to the previous embodiments in that lenses LNS are of a dot type or an island type rather than a line type extending in a specific direction. In the drawings, the lenses LNS have a hexagonal planar shape. However, the present disclosure is not necessarily limited thereto, and the planar shape of the lenses LNS can be modified to various shapes such as an octagonal shape and a circular shape. A light transmission characteristic control layer TCL may at least partially surround each lens LNS and may be connected as a whole. The cross-sectional shape of the lenses LNS may be substantially the same as that illustrated in FIG. 9. The lenses LNS may be generally shaped like micro-lenses LNS.

In the current embodiment, since the lenses LNS are formed as an island type, light can be directed in all directions in a plan view. Accordingly, view areas may be distributed not only in the first direction DR1 and the second direction DR2, but also in a plane intersecting the first direction DR1 and the second direction DR2.

The embodiments will now be described in more detail through experimental examples.

Figure 22:
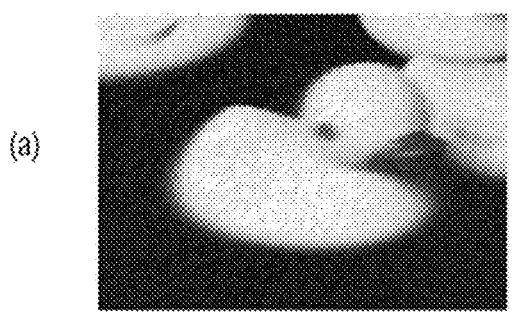
FIG. 22 shows video images showing an effect of an extinction coefficient of a light transmission characteristic control layer on crosstalk of a lens array.
Figure 22:
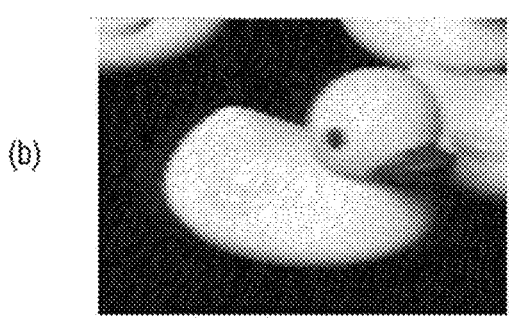
Figure 22:
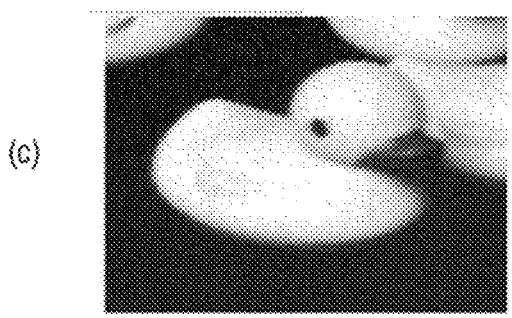

FIG. 22 shows video images for showing the effect of an extinction coefficient of a light transmission characteristic control layer TCL on crosstalk of a lens array. Element (a) is a video image when the light transmission characteristic control layer TCL is not applied, element (b) is a video image when the extinction coefficient is $1\times10^2$ $M^{-1}\cdot cm^{-1}$, and element (c) is a video image when the extinction coefficient is $1\times10^3$ $M^{-1}\cdot cm^{-1}$. In elements (b) and (c), the concentration of the light transmission characteristic control layer TCL was 0.2 M.

Referring to element (a), when the light transmission characteristic control layer TCL was not applied, a general 3D stereoscopic image was obtained, and crosstalk occurred at a level of 10%.

Referring to element (b), when a light transmission characteristic control layer TCL having a low extinction coefficient was applied, the crosstalk was rather increased to a level of 13% compared to that of element (a). This may be due to a dual-phase image.

Element (c) shows the result of applying a light transmission characteristic control layer TCL having an appropriate level of extinction coefficient, and it was confirmed that the crosstalk was reduced to a level of 3.5%.

Figure 23:
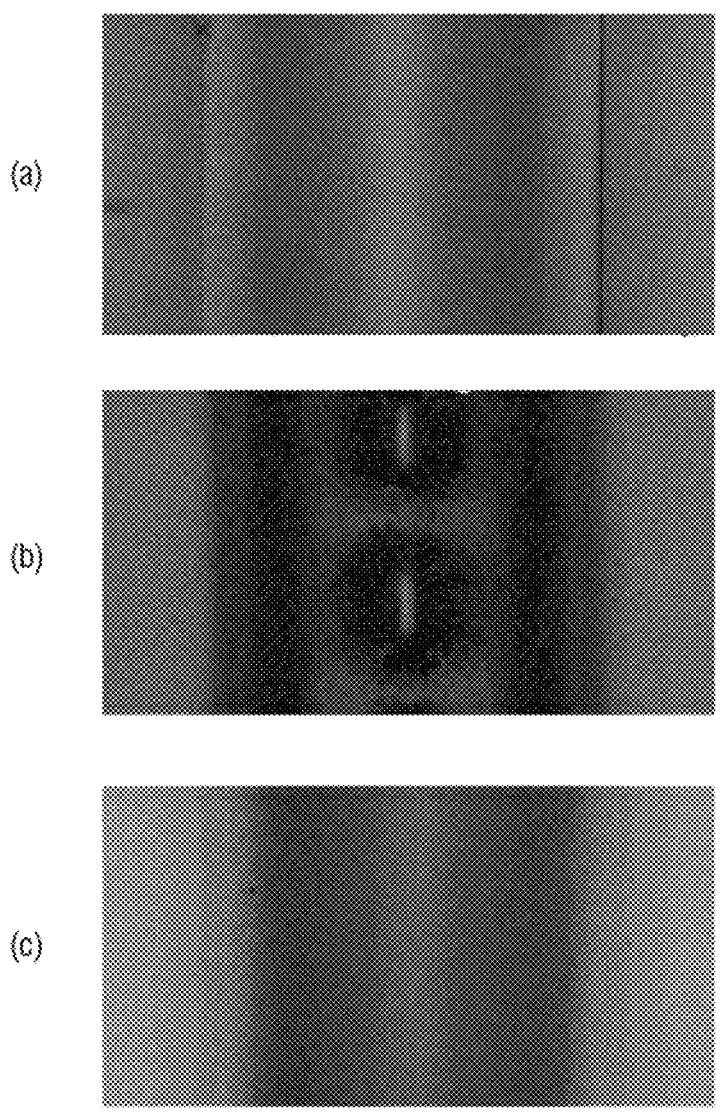
FIG. 23 shows photographs illustrating curing characteristics according to an extinction coefficient of a light transmission characteristic control layer.

FIG. 23 shows photographs (a), (b), and (c) illustrating curing characteristics according to an extinction coefficient of a light transmission characteristic control layer TCL. Element (a) is a plan photograph of a light transmission characteristic control layer TCL having an extinction coefficient of 0.2 to $0.3\times10^2$ $M^{-1}\cdot cm^{-1}$ as a case where the extinction coefficient is less than $1.95\times10^2$ $M^{-1}\cdot cm^{-1}$. Element (b) is a plan photograph of a light transmission characteristic control layer TCL having an extinction coefficient of 3.0 to $3.5\times10^3$ $M^{-1}\cdot cm^{-1}$ as a case where the extinction coefficient is greater than $1.95\times10^3$ $M^{-1}\cdot cm^{-1}$. Element (c) is a plan photograph of a light transmission characteristic control layer TCL having an extinction coefficient of 1.0 to $1.2\times10^3$ $M^{-1}\cdot cm^{-1}$ as a case where the extinction coefficient is in a range between $1.95\times10^2$ $M^{-1}\cdot cm^{-1}$ and $1.95\times10^3$ $M^{-1}\cdot cm^{-1}$.

Referring to Element (b), it can be seen that photocuring was incompletely performed because the extinction coefficient was too large. On the other hand, Elements (a) and (c)

show good curing quality. However, in the case of Element (c), a double image is shown due to high transmittance, and thus crosstalk increases.

Figure 24:
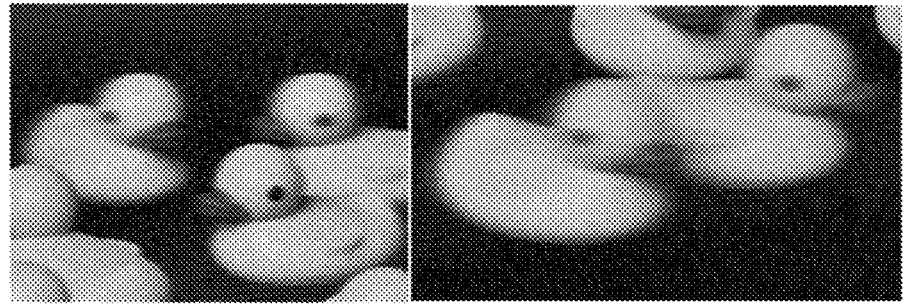
FIG. 24 shows video images for showing the effect of a ratio of a width of a light transmission characteristic control layer to a width of a lens on crosstalk.
Figure 24:
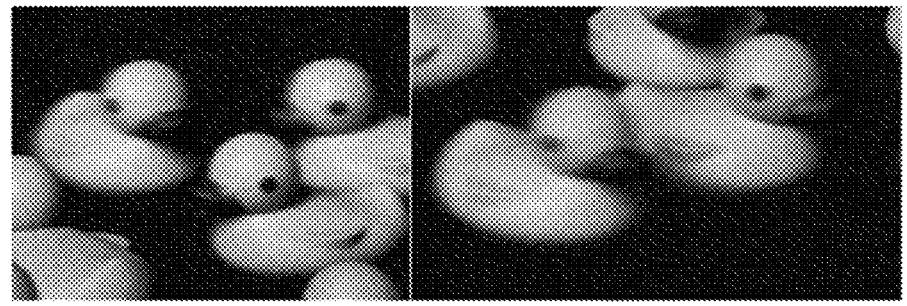
Figure 24:
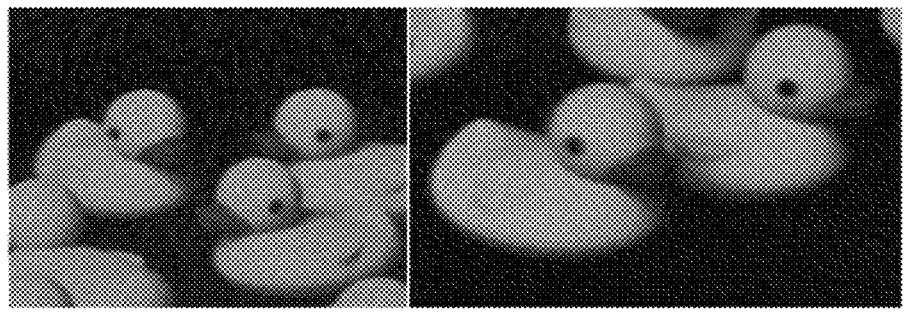

FIG. 24 shows video images for showing the effect of a ratio of a width of a light transmission characteristic control layer TCL to a width of a lens LNS on crosstalk.

Element (a) is a video image when the light transmission characteristic control layer TCL is not applied, element (b) is a video image when the ratio of the width of the light transmission characteristic control layer TCL to the width of the lens LNS is 20%, and element (c) is a video image when the ratio of the width of the light transmission characteristic control layer TCL to the width of the lens LNS is 35%. In each figure, the picture on the left represents a negative depth region, and the picture on the right represents a positive depth region. Referring to elements (a) through (c), it can be seen that element (c) has the highest sharpness.

As confirmed experimentally, in element (a), the crosstalk at the center was 8.4%, and the average crosstalk for all viewing angles was 10%. In element (b), the crosstalk at the center was 0.9%, and the average crosstalk was 5.4%. In element (c), the most excellent crosstalk reduction effect was exhibited because the crosstalk at the center was 0.6%, and the average crosstalk was 3.5%.

While embodiments of the present disclosure have been particularly shown and described with reference to the drawings, it will be understood by those of ordinary skill in the art that various changes in form and detail may be made therein without departing from the spirit and scope of the present disclosure.

What is claimed is:

1. A display device, comprising:
   a display panel; and
   a lens array disposed on a surface of the display panel and comprising a plurality of lenses and a light transmission characteristic control layer disposed on a valley of each of the plurality of lenses,
   wherein the light transmission characteristic control layer comprises a light absorbing material, and a stacked thickness of the light transmission characteristic control layer is less than or equal to half of a height of each of the plurality of lenses, and
   wherein a width of the light transmission characteristic control layer is in a range of 25% to 40% of a width of each of the plurality of lenses.

2. The display device of claim 1, wherein the light transmission characteristic control layer exposes at least a portion of each of the plurality of lenses.

3. The display device of claim 1, wherein the display panel comprises a plurality of pixels, each comprising an emission area, and the light transmission characteristic control layer does not overlap the emission area.

4. The display device of claim 3, wherein a width of the light transmission characteristic control layer is smaller than or equal to a gap between the emission area of neighboring pixels of the plurality of pixels.

5. The display device of claim 1, wherein an extinction coefficient of the light transmission characteristic control layer is in a range of $1.95 \times 10^2$ $M^{-1} \cdot cm^{-1}$ to $1.95 \times 10^3$ $M^{-1} \cdot cm^{-1}$.

6. The display device of claim 1, wherein a molar concentration of the light absorbing material is in a range of 0.05 M to 0.5 M.

7. The display device of claim 1, wherein the light transmission characteristic control layer directly contacts a surface of each of the plurality of lenses.

8. The display device of claim 1, wherein a solid-phase refractive index of the light transmission characteristic control layer is 0.9 to 1 times a solid-phase refractive index of each of the plurality of lenses.

9. The display device of claim 1, wherein a thickness of the light transmission characteristic control layer decreases from a center toward edges thereof.

10. The display device of claim 9, wherein an upper surface of the light transmission characteristic control layer is substantially flat.

11. The display device of claim 1, wherein each lens of the plurality of lenses extends in a first direction, and the plurality of lenses are arranged in a second direction intersecting the first direction.

12. The display device of claim 11, wherein the light transmission characteristic control layer has a line shape extending in the first direction.

13. The display device of claim 1, wherein the light transmission characteristic control layer further comprises a photocurable resin, and the light absorbing material is distributed within the photocurable resin.

14. The display device of claim 1, wherein each lens of the plurality of lenses is shaped like a circular or polygonal island.

15. The display device of claim 14, wherein the light transmission characteristic control layer at least partially surrounds each lens of the plurality of lenses.

16. The display device of claim 1, wherein the light transmission characteristic control layer is coated on each of the lenses of the plurality of lenses through a jetting process or a needle application process.

17. The display device of claim 1, wherein the light absorbing material is an electrochromic material or a photochromic material.

18. A lens array, comprising:
    a pattern layer comprising a plurality of lenses; and
    a light transmission characteristic control layer disposed on a valley of each of the plurality of lenses, the light transmission characteristic control layer having a pair of side surfaces contacting neighboring lenses of the plurality of lenses and an exposed upper surface;
    wherein the light transmission characteristic control layer comprises a light absorbing material, and a stacked thickness of the light transmission characteristic control layer is smaller than a height of each of the plurality of lenses, and
    wherein the upper surface of the light transmission characteristic control layer is curved.

19. The lens array of claim 18, wherein the pattern layer further comprises a base portion disposed under the plurality of lenses and integrally connecting the plurality of lenses.

20. The lens array of claim 18, further comprising a base disposed under the pattern layer.

21. The lens array of claim 18, wherein a width of the light transmission characteristic control layer is in the range of 25% to 40% of a width of each of the plurality of lenses.

22. The lens array of claim 18, wherein an extinction coefficient of the light transmission characteristic control layer is in a range of $1.95 \times 10^2$ $M^{-1} \cdot cm^{-1}$ to $1.95 \times 10^3$ $M^{-1} \cdot cm^{-1}$.

23. The lens array of claim 18, wherein a molar concentration of the light absorbing material in the light transmission characteristic control layer is in a range of 0.05 M to 0.5 M.

24. The lens array of claim 18, wherein the top surface of the light transmission characteristic control layer is concave.

25. The lens array of claim 18, wherein the top surface of the light transmission characteristic control layer is convex.

\* \* \* \* \*